US005640537A

United States Patent [19]

Jessen et al.

[11] Patent Number: 5,640,537

[45] Date of Patent: *Jun. 17, 1997

[54] APPARATUS FOR CAUSING A COMPUTER SYSTEM TO RESPOND TO EMULATED USER INTERACTION IN THE ABSENCE OF ACTUAL USER INTERACTION

[75] Inventors: Jay Alan Jessen, Santa Clara; Palanivelu Nagarajan, Campbell; Sean Ludlow Flynn, Cupertino; James Alan Schneider, San Jose, all of Calif.

[73] Assignee: Apple Computer, Inc., Cupertino, Calif.

[ * ] Notice: The term of this patent shall not extend beyond the expiration date of Pat. No. 5,410,681.

[21] Appl. No.: 293,573

[22] Filed: Aug. 22, 1994

Related U.S. Application Data

[63] Continuation of Ser. No. 796,083, Nov. 20, 1991, abandoned.

[51] Int. Cl.[6] ........................................ G06F 11/30

[52] U.S. Cl. .................... 395/500; 364/242.94; 364/264; 364/266; 364/267; 364/928; 364/943.9; 364/944.9; 364/DIG. 1; 395/329

[58] Field of Search .............................. 395/183.01, 600, 395/650; 371/67.1, 16.1, 16.2, 19

[56] References Cited

U.S. PATENT DOCUMENTS

| | | | |
|---|---|---|---|
| 4,051,326 | 9/1977 | Badagnani et al. | 179/2 DP |
| 4,710,869 | 12/1987 | Enokizono | 395/500 |
| 4,882,674 | 11/1989 | Quint et al. | 364/200 |
| 4,899,306 | 2/1990 | Greer | 364/900 |
| 4,907,146 | 3/1990 | Caporali | 364/132 |
| 4,920,481 | 4/1990 | Binkley | 395/500 |
| 5,036,315 | 7/1991 | Gurley | 340/721 |
| 5,045,994 | 9/1991 | Belfer et al. | 395/500 |
| 5,107,497 | 4/1992 | Lirov et al. | 371/15.1 |
| 5,153,886 | 10/1992 | Tuttle | 371/67.1 |
| 5,157,782 | 10/1992 | Tuttle et al. | 395/575 |
| 5,185,857 | 2/1993 | Roamanith et al. | 395/148 |
| 5,214,785 | 5/1993 | Fairweather | 395/800 |
| 5,233,611 | 8/1993 | Triantafyllos et al. | 371/16.1 |

OTHER PUBLICATIONS

Rose, Caroline, Hacker, Bradley, Anders, Robert, Withey, Katie, Metzler, Mark, Chernicoff, Steve, Espinosa, Chris Averill, Andy, Davis, Brent and Howard, Brian, Titled "Inside Macintosh vol. I", Publisher Addison–Wesley Publishing Company, Inc., Apr. 1987, United States and Canada, pp. I–276, I–311 to I–334.

Sidhu, Gursharan, S., Andrews, Richard F. and Oppenheimer, Alan B., Titled "Inside Apple Talk", Publisher Addison–Wesley Publishing Company, Inc., United States and Canada, Mar. 1989, pp. 9–1 to 9–28.

*Primary Examiner*—Thomas G. Black

*Assistant Examiner*—Hosain T. Alam

*Attorney, Agent, or Firm*—Blakely, Sokoloff, Taylor & Zafman

[57] ABSTRACT

An apparatus for testing a first computer system. Means for emulating user interaction on the first computer system and a means for determining the state of user interface objects on the display and the operating status of the first computer system is provided. In various embodiments, the means for emulating user interaction comprises a means for emulating keyboard and mouse input on the first computer system. The means for emulating mouse movement comprises a means for updating data structures in the first computer system, such that when the data structures are updated, user control of the keyboard and mouse is emulated. Means for determining the attributes of windows displayed on a display of the first computer system is provided, along with means for determining the attributes of menus on the displayed on the first computer system and means for determining the current position of the cursor of the first computer system, among other user interface objects. Abstractions of these user interface objects are transmitted between the first computer system and the testing means. The control of the first computer system is performed by a second computer system to provide repeatable testing on a variety of computer systems for diagnosis of faults.

17 Claims, 11 Drawing Sheets

APPARATUS FOR CAUSING A COMPUTER SYSTEM TO RESPOND TO EMULATED USER INTERACTION IN THE ABSENCE OF ACTUAL USER INTERACTION

This a continuation of application Ser. No. 07/796,083, filed Nov. 20, 1991 and now abandoned.

BACKGROUND OF THE INVENTION

1. Field of the Invention

This invention relates to performing diagnostics on computer systems. More specifically, this application relates to remotely testing computer systems having a variety of hardware/software combinations.

2. Background of Related Art

Traditional testing of computer systems and their associated software and firmware typically require that manual tests be designed in order to make sure that each function on given programs is operating as expected. In addition, such testing must be performed on a variety of systems running different hardware/software combinations to determine the compatibility of the underlying system. These tests require substantial user intervention because certain operations on these computer systems must be performed manually. Also, the results of those operations must be monitored by looking at files, the display of the system, or other results of performing the operations to determine if the proper result has been accomplished. This is a time-consuming and tedious process. Sometimes this takes the form of releasing a pre-release version of the system, a so-called "beta release." This type of release of a product is one which is distributed to a limited number of individuals, typically very experienced computer program developers, and/or system programmers, to determine if there are any remaining errors or other unexpected results in the underlying system or system software.

Both the initial testing process and the beta testing process, discussed above, are time-consuming and tedious tasks for individuals testing the computer system. They are also expensive for a manufacturer. Such testing requires that the system be tested on a wide variety of compatible platforms (for instance, in the Macintosh brand family of computers, the Macintosh SE brand computer system, the Macintosh II, and other systems using a variety of hardware platforms but having compatible operating system software). For instance, an error which might occur in one model of machine or in one type of software combination may not occur on another machine having a different hardware and/or software combination. Testing each hardware platform in combination with certain underlying software requires careful testing for proper compatibility.

In addition to a variety of manual tests required for ensuring the functioning of a computer system, because the tests are performed manually they may become very time-consuming and tedious. The testing process may also become error-prone, depending on the individuals performing the testing of systems. To ensure that a computer software product is fully functional before shipping a released product, the so-called "beta release" process takes a certain period of time. A long delay in testing a final version of a computer system, including specific hardware and software combinations, may delay the release of a product so much that competitive advantage may be lost.

Some prior art systems used for testing also require that the user input a series of commands and/or user activity which will generate an expected result. These tests must be performed flawlessly in order for the testing process to be performed effectively. In addition, the user must view the tested system's display and/or other results to determine if the user action achieved the desired result. Again, to ensure proper functioning, this must be done repetitively. Human beings typically cannot perform repetitive tasks such as these in an effective manner and monitor all the actions on the tested computer system perfectly. Also, testing of new computer systems requires repetitive and repeatable testing. This is to ensure that errors ("bugs") or other unexpected results are reproducible so that the source of the error can be determined. Therefore, repeatable testing on various hardware/software platforms is required. These tests should also have a minimum impact on the system being tested so as to minimize the effect of the testing process (called "corruption") on the computer being tested. These tests should also have a means for recording the results of the tests so that they may be examined to analyze the error.

In summary, substantial delays and errors are caused in the testing of computer systems prior to shipping. Also, the testing process may fail to catch all errors in a particular hardware/software combination.

SUMMARY AND OBJECTS OF THE INVENTION

One of the objects of the present invention is to provide an automated means for testing a wide variety of computer systems in a standardized way.

Another of the objects of the present invention is to provide a means for testing computer systems in a relatively systematic and error-free environment.

Another of the objects of the present invention is to provide a means for testing a computer system repetitively such that any errors in a variety of computer hardware/software combinations may be reproduced and thus more easily eliminated.

Another of the objects of the present invention is to provide a cost effective means to test a wide variety of computer software/hardware combinations.

Another of the objects of the present invention is to provide a means for remotely testing at least one computer system to minimize the interference (the corruption) of the computer system by the apparatus performing the test.

Another object of the present invention is to provide a means for remotely testing a plurality of computer systems by emulating user manipulation of user interface objects on the systems and monitoring the results of the manipulation remotely.

Another of the objects of the present invention is to provide a means for remotely monitoring the user interface and operating system of a computer system.

These and other objects of the present invention are provided for by an apparatus for testing a first computer system which comprises a means for emulating user interaction on the first computer system and a means for determining the state of user interface objects on the display and operating status of the first computer system. In various embodiments, the means for emulating user interaction comprises a means for emulating keyboard and mouse input on the first computer system. The means for emulating mouse movement comprises a means for updating data structures in the first computer system, such that when the data structures are updated, user control of the keyboard and mouse is emulated. The device also comprises event handling means for emulating selections of the mouse. The means for determining comprises means for determining the attributes of windows displayed on a display of the first computer system, means for determining the attributes of menus on the displayed on the first computer system, and means for determining the current position of the cursor of the first computer system. In a preferred embodiment, data structures in the memory of the first computer system are scanned to return these user interface items. Abstractions of these user interface objects are transmitted between the first computer system and the testing means. The control of the first computer system (a target) is performed by a second computer system (a host) to provide repeatable testing on a variety of computer systems for diagnosis of faults.

These and other objects of the present invention are provided for by a system for testing computer systems comprising a host computer system for transmitting information directing emulated user actions on a target computer system, and for receiving information from the target computer system regarding the display and operating status of the target computer system. The system further comprises a target computer system coupled to the host computer system, the target computer system receiving the information directing emulated user actions and performing the emulated user actions. The target computer system further transmits the status of the display of the target computer system to the host computer system. In a preferred embodiment, these include, among other things, user interface objects on the display of the target computer system, the current application running, the type of computer system, etc. Emulated user actions include performing mouse movements, selections, and keyboard input in a preferred embodiment.

These and other objects of the present invention are provided for by a system for testing computer systems which comprises a first target computer system having a first hardware/software combination and a second target computer system which has a second hardware/software combination. The system further comprises a host computer system which controls the actions of the first target computer system with a first set of tests and the second target computer system with a second set of tests. These tests emulate user actions and cause either the first or the second computer system to report the state of user interface objects back to the host computer system. A means for communicating, such as a computer network, couples the host computer system to the first and second target computer systems. The preferred embodiment therefore provides improved means for repetitively testing the first and second computer systems (or any computer systems) having a variety of hardware/software combinations to determine faults in the system which are reproducible for diagnosing faults.

BRIEF DESCRIPTION OF DRAWINGS

The present invention is illustrated by way of example and not limitation of the figures of the accompanying in which like references indicate like elements and in which.

DETAILED DESCRIPTION

The present invention covers a method and apparatus for remotely testing and monitoring computer systems. In the following description, for the purposes of explanation, specific data structures, information, packets, protocols, user interface objects, and other details used by the preferred embodiment are set forth in order to provide a thorough understanding of the present invention. It will be appreciated, however, by one skilled in the art that the present invention may be practiced without these specific details. In other instances, well-known circuits and devices are shown in block diagram form in order to not unnecessarily obscure the present invention.

Figure 1:
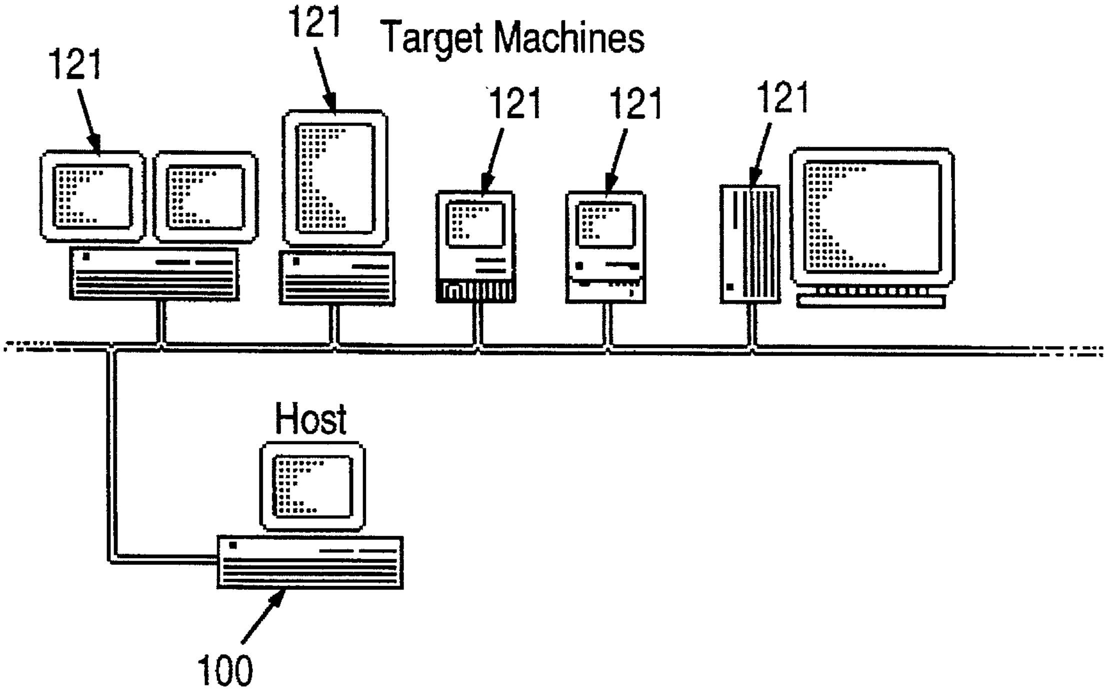
FIG. 1 shows the coupling of computer systems used in the preferred embodiment.

Coupling of the Preferred Embodiment—FIG. 1

The preferred embodiment is a testing environment wherein a "host" computer system issues commands to "target" computer systems, the target computer systems returning the results of those operations back to the host. The coupling of the systems in the preferred embodiment is graphically represented with reference to FIG. 1. For instance, on a network such as 110 shown in FIG. 1, a host 100 may be coupled to the network for communication with various target machines such as 121 through 125. The host computer system 100 communicates with each of target machines 121 through 125 over network 110 for instructing the targets to perform various tasks. Each of the target machines 121 through 125 can communicate over network 110 for providing results of those tasks back to host 100 when host 100 initiates a communication. In a preferred embodiment, host 100 and target machines 121 through 125 are members of the Macintosh brand family of personal computers manufactured by Apple Computer, Inc. of Cupertino, Calif. In a preferred embodiment, network 110 is the Appletalk brand local area network (LAN). It will be appreciated by one skilled in the art, however, that any type of machine which has a network capability may communicate with other machines in a network such as 110 in a similar manner. Network 110 may be one of the other types of LAN's commercially available in the market, such as Ethernet, a token ring, or a star LAN system in alternative embodiments.

The preferred embodiment is a system in which tasks are described in a high level script or command language interpreted and executed by host machine 100. On the basis of the commands written in this script language, host machine 100 directs target machines 121 through 125 to perform certain actions and respond to the host with the results of those actions. Communication is provided in a manner well-known to those skilled in the art, between host 100 and targets 121 through 125 using Appletalk brand network protocols (for instance, the Appletalk Transaction Protocol or ATP) such as those referred to in the publication "Inside Appletalk, Second Edition" by Gursharan E. Sidhu, Richard F. Andrews, and Alan B. Oppenheimer (1990) available from Addison-Wesley Publishing Company, Inc. (hereinafter "Inside Appletalk"). The majority of the underlying host and target programs (known as the "host" and "agent" respectively) of the preferred embodiment is written in the C++ programing language and compiled using the MPW C++ compilation tools available from Apple Computer, Inc. of Cupertino, Calif. Portions are implemented in 680×0 assembly language. It can be appreciated by one skilled in the art that any other type of high level language, such as FORTRAN, Pascal, or low level language such as assembly language, may be used to implement the system in alternative embodiments.

The architecture of the preferred embodiment is based on a theater metaphor. Each individual test which is written for target machines such as 121 through 125 shown in FIG. 1 is executed by "actors" or subtasks in the host. Each of the actors plays different roles, performing different tests by interpreting and executing actions indicated by different "scripts" (command language routines) for target machines coupled to network 110. There is also a "director" in the system of the preferred embodiment which stages, oversees, and directs the test execution of each of the actors. An actor may be any entity that plays a role in a testing process. The most common types of actors which are used in the preferred embodiment are those which emulate user action in the target system. Other actors which are contemplated within the spirit and scope of the preferred embodiment are those which include a human tester entering commands on the keyboard directly on each of the target machines, or any external functions which can communicate with the director or the actors running the tests. Each of the actors runs as an independent task in a multitasking mode along with the director. Actors in the system of the preferred embodiment are different processes or "threads" which are controlled by the script associated with the actor and the director.

Because each of the target machines 121 through 125 may be different models of the same computer system with different hardware and/or software configurations, it is possible to test computer software on each of the systems using the same set of tests, but in different hardware/software environments. Therefore, compatibility testing of the program with various configurations of hardware and software may be performed. In addition, the preferred embodiment provides for rigorous repetitive testing of each of the target machines using the scripts for each of the actors. Therefore, faults may be detected from multiple iterations of a script, wherein a manual testing of individual machines may not otherwise uncover such flaws.

The system of the preferred embodiment comprises two major components: the host system, and the target system(s). The host system provides all the "acting" and "directing" functions as described above. The host interprets the scripts and issues commands to the target machines to perform emulated user operations based on those scripts. Also, the host issues queries to determine the state of the target machines and receives messages from the target machines responding with the requested information. In this manner, various user actions may be emulated on the target machines and the results examined by the host for faults. The target machines receive the messages transmitted by the host, perform the action as if a user was operating the target machine, and sample certain data structures within the target machine reporting back to the host machine to indicate whether given operations were successful or not. These functions will be discussed in more detail below. The program running on the target machine, known as an "agent," is installed on the target machine in a predefined directory (the "System Folder" in the Macintosh brand operating system) so that it will be recognized and loaded during power up initialization of the target machine. In the Macintosh brand operating environment, the agent program is loaded into the central processing unit as an initialization routine known as an "INIT" or "system extension." In alternative embodiments on IBM PC brand compatible computer systems, such a routine may be loaded as a "TSR" ("terminate and stay resident") program which resides in the memory of the target system and performs given actions as directed by the host.

Command Line Invocation

The host machine operates in two modes for initiating execution of scripts via actors onto target machines: a command line mode; or an interactive window interface controlled mode. The command line scheme may be used to launch actors in the preferred embodiment using a command line such as:

```
vu-a "Actor1"-t"*:TargetMac"-s Script.vu
```

which starts the actor thread "Actor1" in the host to control the target machine "TargetMac" using the script "Script.vu." Each of the parameters in the above example command line are defined as follows. The "-a" option specifies the name of the actor. This name is an alphanumeric string. From that point on, the test running on the target machine may be referred to by this string. So, in the example given above, the test running on the target machine may be referred to as the process "Actor1." This may be used for checking the results of given tests, or performing single line commands. The "-t" option indicates the target address of the target machine. In this case, the target is "*:TargetMac." The target name is specified in the following format: "<zone>: <target user name>." The "*" as used in the Appletalk brand networking system, is the current zone that the host machine resides in. Further, the target user name, in this case, "TargetMac" is the second field. The specification of named entities in networks such as zones and user names are discussed in more detail in the publication "Inside Appletalk," at pages 7–1 to 8–24. It will be appreciated by one skilled in the art that other types of networking systems may be used in alternative embodiments which use unique network addresses or names for target machines. In an alternative embodiment, the network path name may be replaced with the Internet address of the target machine. This address will be of the form "<network number>: <note I.D.>: <socket number>."

The "-s" option, as shown on the command line above, is used for indicating the name of the script (or command) file to be executed on the target machine by the actor. Script files contain a sequence of instructions which cause actions to occur on the target machine for either causing specific user actions to be emulated, checking the state of the target machine, or performing other functions such as modifying variables within the script file (for example, error counts) for performance of the test. Script files will be discussed in more detail below.

Other options which may be specified on the "vu" command line include the following:

-c: This option indicates compile only. It is used for checking the syntax of the script file without executing it. Error messages are reported to the user of the host using the standard output file (for instance, the display). Using this option does not require the user to specify a target machine.

-l <log file name>: This is used for specifying the name of a log file. Any output messages from the script file which would normally go to the standard output file of the host (such as the display) or error warning messages will be placed into the file entitled <log file name> on the host.

-dt: This option indicates that a diagnostic trace is to be performed when executing the script file. This option may only be used when a log file has been specified using the -l option discussed above. Any errors or other warning messages will be placed into the file specified by the -l option.

-o <output file name>: This option is used to redirect the output of print or display statements from the standard output file (typically the display) to a specified file. This may be used for redirecting the output of individual actors to specified files. Therefore, separate files may be maintained as outputs for separate actors.

-m <mouse speed>: This option is used to specify the speed of a mouse movement on the target machine. A mouse moves in predefined time intervals known as steps. <mouse speed> specifies the number of pixels that the mouse will move in each step on the target machine. If all mouse movements are desired by the user to be moved in one step, the speed should be set to zero. The default setting for the speed is 50.

-k <key stroke rate>: This option is used to set the maximum rate of keystrokes on the target machine in characters per second. The default setting is 20.

-p <patience setting>: This option is used to set the overall execution speed of the actor (and therefore commands) on the target machine. Actions get slower as patience increases. The default setting for patience is one.

-fail <n>: This command is used to specify the maximum number of command failures that are to be allowed in the course of script execution. If the number of failures exceeds <n>, script execution will abort. The default setting is infinite, so script execution will not stop until the script has been completed or the user aborts execution.

-timeout <t>: This option is used to set the maximum time to wait for a transaction with a target machine to complete. If the transaction fails to complete within <t>, then the transaction is considered to have failed. The default setting is 20. The maximum value is 255.

-retries <r>: This sets the maximum number of times the actor retries a transaction with the target machine. The default setting is 3. The maximum number is 255. If 255 is given, in the preferred embodiment, the number of retries will be considered to be infinite. When this occurs, the actor will keep trying to reaquire the target.

-cs: This makes the actors string matching case sensitive. The default for this setting is that string matching is not case sensitive. For instance, in default operating mode, "USER" and "user" would be considered the same entity by an actor, but would not be the same when the "-cs" option is used.

-libs <search path>: This is used to specify the path or the directories in which the host is to access task libraries. The system of the preferred embodiment looks for declared libraries in the current directory from which the program is operating. If not found, the search path specified by this command is used.

Each of the options mentioned above may be specified with a number suffix to indicate which actor the commands apply to. If a command is specified without a number suffix, then that command applies to all the actors currently running. For instance, if a script is run with a "-s" option, then that script will be run on all the actors currently defined. With the exception of the "-t," "-l," and "-o" options, any command given without a number is applied to all actors currently specified. For example, three actors may be initiated using the following script commands:

| | | |
|---|---|---|
| vu | -a1 | "Admin"∂ |
| | -t1 | "*:gozer"∂ |
| | -s1 | "Admin.Test.vu"∂ |
| | -o1 | "AdminTest.out"∂ |
| ∂ | | |
| | -a2 | "BusyTester"∂ |
| | -t2 | "*:chuck"∂ |
| | -s2 | "BusyWorkstation.vu"∂ |
| | -o2 | "BusyWS.out"∂ |
| | -m2 | 1∂ |
| | -k2 | 50∂ |
| ∂ | | |
| | -a3 | "LazyTesting"∂ |
| | -t3 | "Farside:Twiddledee"∂ |
| | -s3 | "LazyWorkstation"∂ |
| | -o3 | "LazyWS.out"∂ |
| | -m3 | 1∂ |
| | -k3 | 5 |

In this example, each of the commands with a number suffix is applied to the actor with that number. For instance, all the commands with the "1" suffix are applied to the actor "Admin," those with "2" are applied to "BusyTester," and those with a "3" are applied to "LazyTester."

There are three actors in this example, each running different scripts. Actor 1 "Admin" is running the test "AdminTest.vu," its output is redirected to "AdminTest.out," and its target machine is the unit named "gozer." This target's mouse and keyboard settings have been set to the defaults. Actor 2 "BusyTester" is running on the unit named "chuck" and is running the test script "BusyWorkstation.vu" with the standard output redefined to "BusyWS.out." The mouse speed and the keyboard speeds have been redefined to very high values (1 and 50, respectively) emulating a user who is operating at a higher rate than the default. Actor number 3 "LazyTester" is running in the zone "Farside" on the unit "Twiddledee." LazyTester is running the script "LazyWorkstation.vu," has its standard output redefined as "LazyWS.out," and has its mouse and keyboard values set to a very low value emulating a user who is operating at a low rate.

As mentioned above, the use of a command without a number suffix indicates that the command should be run on all of the targets currently defined. This is shown in the following example:

| | | |
|---|---|---|
| vu | -t1 | "*:gozer"∂ |
| | -m1 | 10∂ |
| ∂ | | |
| | -t2 | "*:chuck"∂ |
| | -m2 | 5∂ |
| ∂ | | |
| | -t3 | "Farside:Twiddledee"∂ |
| | -m3 | 1∂ |
| ∂ | | |
| | -s | "Chooser QuickLook.vu"∂ |
| | -k | 30 |

The three target machines all will have the script "Chooser QuickLook.vu" run upon them as it is specified with the "-s"

option with no number suffix. However, each of these options has a different mouse speed specified by the "-m" option. Also, the keyboard rate for each of the targets is the same as specified by the "-k" option with no number suffix.

Note that each of the lines in the above scripts are followed by a character "∂." This character indicates that the command continues onto the next line. Therefore, the example given above is treated as one command line.

Figure 2:
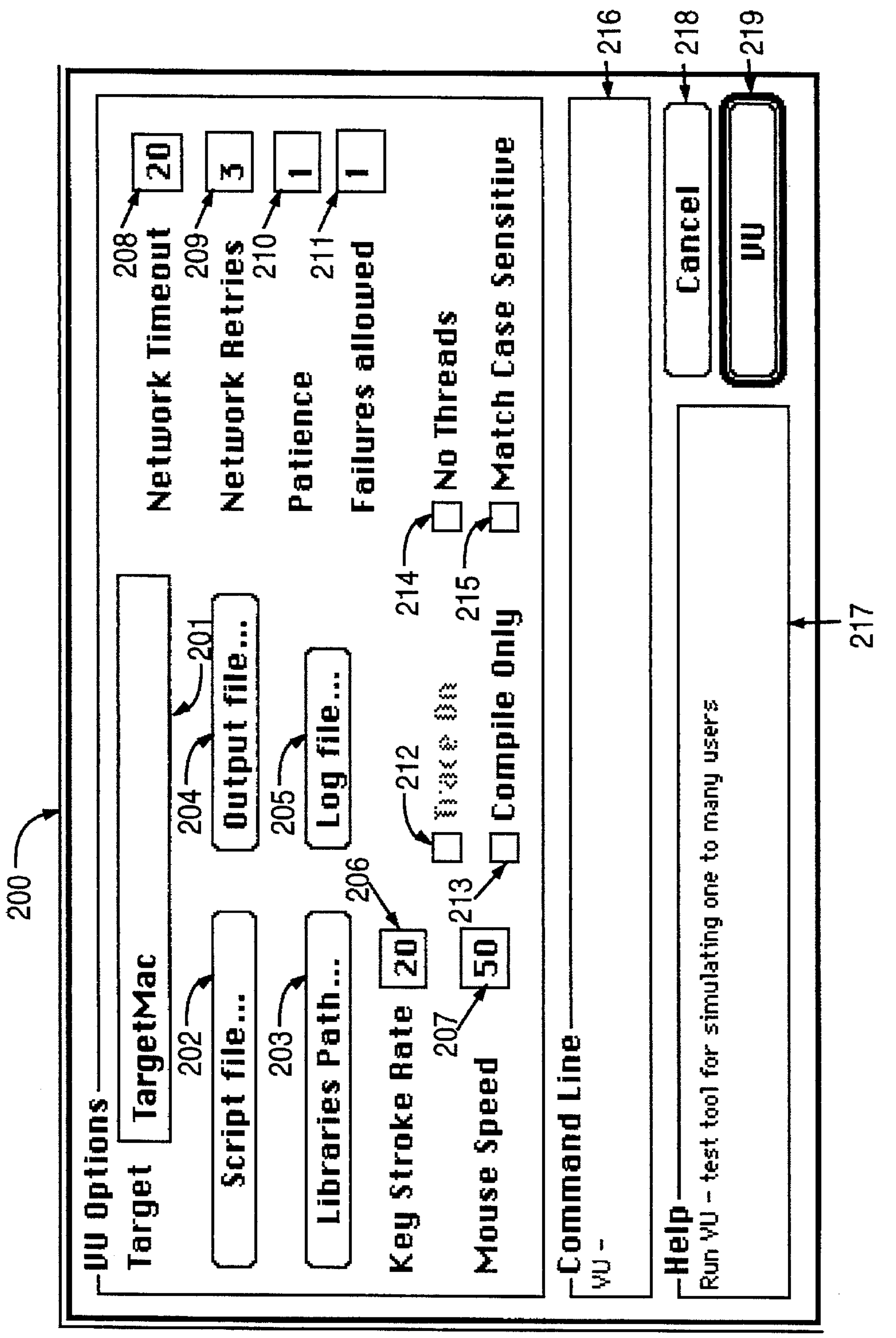
FIG. 2 shows a menu screen for initiating a test script from the host machine to be performed on a target machine.

Interactive Window Interface Invocation—FIG. 2

An example of the interactive window interface provided by the preferred embodiment is shown in FIG. 2 as 200. Window 200 is displayed when the user activates one of the pull-down menu options provided by the preferred embodiment. This window provides all the options provided by the command interface discussed above, but with an interactive graphical user interface instead of specifying various command line options. Most of the options shown in 200 of FIG. 2 are self explanatory, however, they will be discussed here in order to provide a clear understanding of the preferred embodiment. Each of the fields is accessed by selecting the option shown in window 200 using a mouse or other cursor control device on the host machine. The user must, in some cases, indicate specific information for that option by typing in information using the keyboard or accessing another window. For instance, field 201 of window 200 will contain the name of the target machine. As discussed with reference to the "-t" option in the command line above, the name is in the form of <zone>:<user name:>, however, if the target machine is in the same network zone as the host machine, then only the <user name> needs be entered into this field. The target machine in the instance shown in FIG. 2, as indicated in field 201, is "TargetMac."

Other options are provided by the "dialog" buttons 202 through 205. Each of these buttons, when selected, will prompt the user for additional information using other windows. For instance, "Script file" button 202 will be selected by the user for indicating the script file to be run on the target machine. This performs the same function as the "-s" option specified in the command line interface above. The selection of this button will cause a standard file dialog box to be displayed allowing the user to select the location of the script file to be executed on the target machine. The file dialog box is well-known to those familiar with the interactive windowing interface of the preferred embodiment.

The other "buttons" 203 through 205 have similar functions to their command line counterparts. The "Libraries Path" option 203 essentially has the same effect as the "-libs" option. The "Output file" button 204, when selected, also brings up a file dialog and essentially performs the same function as the "-o" command allowing redirection of the standard output file to another file in the computer system. Finally, the "Log file" button 205 also brings up a standard file dialog and is used in the same manner as the "-l" option for reporting errors and other messages to the user at the completion of testing.

Numerous other options which are specified by numeric values are shown on window 200 as well. 206 and 207 are fields which, when selected, allow the user to type numeric values into them. Field 206 is the same as the "-k" option and is used for specifying the rate of keyboard input of the actor on the target machine. "Mouse speed" field 207 is similar to the "-n" option used for specifying mouse movement rates of the actor. The "Network Timeout" field 208, "Network Retries" field 209, "Patience" field 210, and the "Failures Allowed" field 211 all correspond with the "-timeout," "-retries," "-p," and "-fail" options discussed with reference to the command interface above and have similar functions to their command line counterparts.

In addition, to the foregoing fields and controls specified above, window 200 also specifies four boolean fields 212 through 215 which are selected to enable certain options. The "Trace On" boolean field 212 activates the "-dt" option discussed above, wherein certain variables and other information are displayed iterably for debugging of the script. Further, the "Compile Only" option 213 is used for generating syntax errors of the script sought to be executed. The "No threads" option 214 is selected for disallowing parallel execution of multiple tests using "threads." One can still run multiple tests but the performance is slower than when using "threads." This deactivates the multitasking feature of the preferred embodiment which allows other actors to be busy while one or more actors waits for a transaction on 110 to complete. The "Match Case Sensitive" option 215 is selected for activating case sensitivity on names used on window 200 and the command script.

The "Command Line" subwindow 216 is used for showing the command line counterparts to the various options selected in window 200. In addition, command line option 216 may be used by the user for entering in command lines directly, instead of selecting options in window 200. "Help" window 217 displays information about a command. The command that the user needs information on is specified in "Command Line" field 216. The last two options in window 200 are the "Cancel" button 218 and the "VU" button 219. 218 is selected by the user for aborting from the current information defined in the window as shown as 200 and exiting. The "VU" option 219 is selected for executing the options currently defined in window 200. Commands interpreted and executed by the host computer of the preferred embodiment will now be discussed.

Interpretive Commands

The preferred embodiment essentially sets forth an entire interpretive "script" language for performing tests upon target machines. Scripts (command language routines) written in this language are interpreted by the host computer and, depending upon information currently retained in the host, forwarded in the form of packetized command(s) to the target machine for requesting various information from the target across network 110 or performing specified actions on the target. The host computer provides the script interpretation functions and the target machine emulates keyboard and mouse activity as if a user was operating the target. This interpretive language provides certain functions provided by other interpreters such as a plurality of variable types which may be defined, and expressions which are evaluated using rules well-known to those skilled in the art, such as those used in the BASIC and/or C++ or other high level programming languages. Expressions may be either variables, numbers, symbolic identifiers, relational or logical expressions, among other things. Expressions and values permitted by the preferred embodiment will not be set forth in detail here, however, it can be appreciated by one skilled in the computer programming arts that these expressions and/or values will be parsed and/or interpreted using rules which are well-known.

Two of the primary functions provided by the preferred embodiment are: (1) emulating user actions on the target computer;, (2) determining the state of the target computer (for example, to determine the results of the emulated user actions). The state of the target machine's display may be referenced using "descriptor" expressions.

Descriptor Expressions

Descriptor expressions are the means by which a script describes something that exists on a target machine. These are used to describe various user interface objects such as windows, menus, and buttons on the display of the target, but are also used for referencing the state of the target, such as the type of CPU, version of the operating system, the current application running, etc. Descriptors are used by the script to specify the state of user interface objects on the display on the target machine. Descriptors may also be used to identify actors or other items in the host or target. Using descriptors, the script can distinguish one entity from another using a minimum amount of information. A summary of descriptors which may be specified in the preferred embodiment are as follows:

| | | | |
|---|---|---|---|
| application | button | checkBox | contentItem |
| control | editText | icon | keyboard |
| menu | menuItem | mouse | picture |
| popup | radioButton | screen | scrollBar |
| staticText | system | target | time |
| userItem | window | | |

Each descriptor is enclosed within brackets, and has the following format:

[descriptor-type trait 1, trait 2, etc.].

Traits define specific attributes of each of the descriptors specified by one of the above names. A window, for instance, will have a particular position, and/or title associated with it. Some of the traits supported by the descriptors in the preferred embodiment are set forth below. Traits may be used by the script for defining particular actions which need to take place, or may be used within the script to determine the current state of the target. These are performed using the "match" and "collect" expressions which are discussed below. The traits of each of the descriptors will now be discussed.

Descriptor Traits

Window Traits

Each of the following is used to define the traits of a given window descriptor. A window descriptor may be used either to specify a window for selection, or it is returned by the host machine to the script for representing the current state of the target machine. A window descriptor is specified using the following format:

[window trait 1, trait 2, etc.]

The traits for window descriptors are as follows:

t: This is used to specify a window's rifle. For instance, in the screen 300 shown in FIG. 3, window 310 will have a title field specified by the "t:" option as "MacPaint 2.0." Examples of descriptor statements which may be referenced are as follows:

| |
|---|
| [window t:'MacPaint 2.0'] |
| [window t:/MacPaint 2.0/] |
| [window t:/MacP≈/] |

Figure 3:
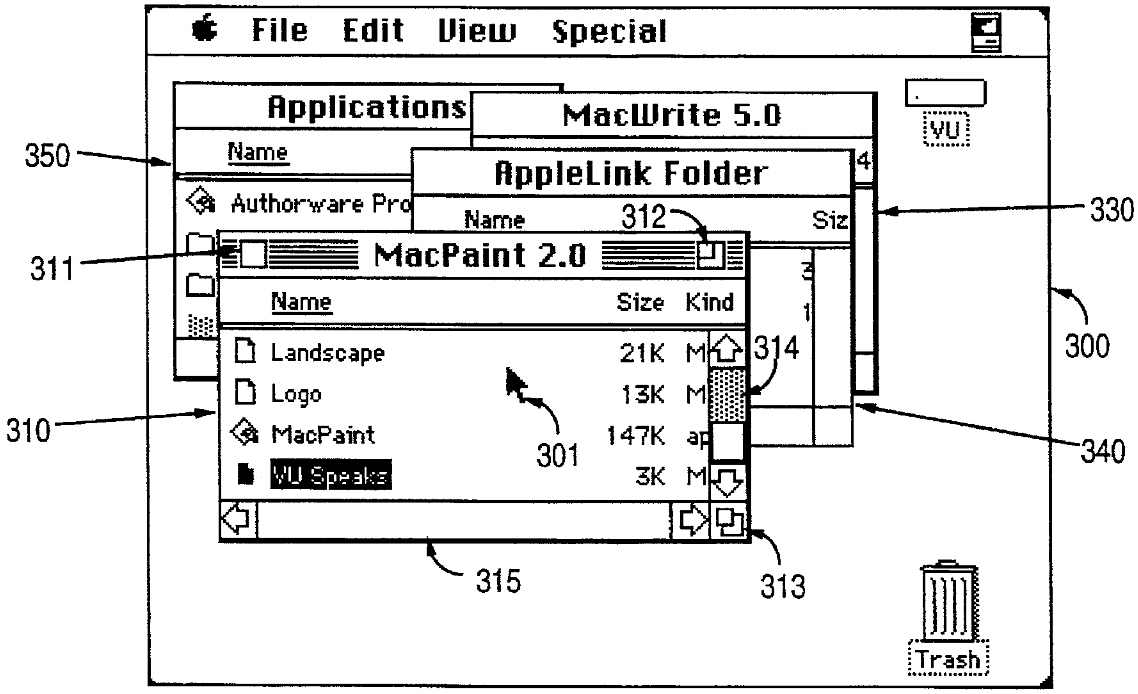
FIG. 3 shows some user interface objects which may be referred to and manipulated by the host machine on a target machine.

Each of the foregoing expressions may be used to refer to window 310 shown in FIG. 3 because that window has the rifle "MacPaint 2.0." The name must be delimited using either the ', ", /characters. In the third example shown above, the "≈" wild card character may be used to match any remaining characters left in the tide because it still uniquely identifies window 310.

o: This is used to specify the rank (ordinal) in ordering of the visible windows in the target window list. This is a numeric value, with the rank of the front window receiving a rank of one and any subsequent window n windows after the front receiving the rank n. For instance, the expression:

[window o:1]

uniquely identifies window 310 shown in FIG. 3 because window 310 is the front-most window shown in screen 300. Any subsequent windows such as window 330 shown in FIG. 3, will receive a subsequent n rank (ordinal) value. Window 330, in the example shown in FIG. 3, is uniquely identified using a 3 because it is the third window back as it appears to a viewer of the display. Window 330 therefore may be uniquely referred to with the descriptor "[window o:3]."

s: This is used to specify a window style. A window has traits associated with it using one of the following symbolic values:

| | |
|---|---|
| document | shadow |
| dialog | plain |
| da | |

A "document" refers to a standard window. This is the type shown as 310 in FIG. 3. A "dialog" is a window which requires some information. A "da" is otherwise known as a "desk accessory" in the Macintosh brand operating system and has another specific format (not shown). A "shadow" window is one which has an apparent shadow on the display. Finally, a "plain" window is one which merely presents information to a user of the system. The plain window has no user interface or other control feature associated with it.

C: Used to specify whether the window has a "close" box. A close box is shown as 311 on 310 of FIG. 3. Selecting this area of screen 300 using a cursor such as 301 shown in FIG. 3 causes the window to disappear from the display. This is a boolean value, which resolves to either true or false.

z: This is used to specify whether the window has a "zoom" box. In FIG. 3, window 310 has a "zoom" box which is shown as 312. This causes a fixed increase in size of windows 310. Again, like the "c:" operator, this expression is a boolean and evaluates to either "true" or "false" in the script language of the preferred embodiment.

g: Used to specify whether the window has a "grow" or "size" box. This is shown on window 310 in FIG. 3 as 313 and is used to increase the window's size on screen 300.

k: Used to list additional objects contained within the window. This descriptor may have any of the following attributes:

| | |
|---|---|
| button | picture |
| checkBox | popup |
| contentItem | radioButton |
| control | scrollBar |
| editText | staticText |
| icon | userItem |

Each of the sub-descriptors defined under the "k:" option may have traits similar to the "window" trait discussed in this section.

r: This is used to specify the dimensions of the bounding rectangle of the window. This may be expressed in either global or local coordinates. Global coordinates are those that form an absolute position on the screen. In other words, an object that is bounded at the very top left portion of a screen such as 300 shown in FIG. 3 will have a starting coordinate at position (0, 0). The coordinate may also be expressed as a value relative to a window. The format of the relative coordinate is currently undefined, however, it is contemplated that in an alternative embodiment, a window with either an ordinal (rank) value, a position value, or a window specified in some other unique manner may be used in conjunction with a position value to indicate a position relative to the window specified.

Examples of the use of the foregoing traits will now be discussed. For instance, with reference to FIG. 3, window 310 may be referenced by the following:

```
[window     s:document c:true z:true g:true
            r:{ 87, 116, 297, 254 }]
```

The "s:" option specifies that window 310 is a document window, "c:" specifies that it has a close box, "g:" specifies that it has a grow box, and "z:" specifies that it has a zoom box. As discussed above, the close box is shown as 311 in FIG. 3, the grow box is shown as in FIG. 3, and the zoom box is shown as 312 in FIG. 3. Further, the window has the coordinates defined as (87, 116, 297, 254) which is the global position value on screen 300 of FIG. 3. Window 310 may also be defined by the following:

```
[window k:{   [scrollBar t:' ' r:{ 87, 237, 281, 253 } s:{ 0, 0 } e:true],
              [scrollBar t:' ' r:{ 280, 154, 296, 238 } s:{ 0, 100 } e:true]}]
```

This descriptor indicates that the window has certain attributes associated with it as defined by the "k:" option. As shown above, the "k:" option defines that it has two scroll bars, whose absolute positions are indicated as shown in the example. Each of the scroll bars has certain traits associated with it as defined by title option (each does not have a title though), and the "r:" option defining their absolute positions. The scroll bars are shown as 314 and 315 on FIG. 3. Each of the scroll bars has two additional traits associated with them, the "s:" option and the "e:" options for indicating the state of scroll bars 314 and 315.

Content Item Descriptors t: Used to specify the text associated with a button, an edit box, or the title of a popup window, etc.

W: Used to specify the window in which the identified object resides.

r: Used to specify the dimensions of the rectangle (in global coordinates) in which the object is specified. The syntax for the item is {left, top, right, bottom}.

e: This value is used to specify the enablement of an item. In the example shown in FIG. 3, all of the items within 310 are currently enabled, therefore, they will have an "e:" value evaluating to "true." The other windows shown in FIG. 3 such as 340, 350, and 360 are not enabled and, therefore, will have "false" e: values associated with them.

Control Descriptors

These traits are used for referring to control items.

h: This value specifies the highlight state of the control. This evaluates to a numeric value at run time which ranges between zero and 255.

s: This is used to specify a control setting of an item on the display. It is used with two numeric values: a first value indicating the state of the item; and the second value indicating the difference between the maximum and minimum values. Therefore, for an item which has a range through which it may move, the first value will represent the position relative to the minimum or maximum values. In the analogy of a fraction, this may be viewed as the numerator. For a scroll bar, such as 314 or 315 shown in FIG. 1, the maximum range is represented by the second value (the denominator) is either the top or the right-most value in the item. For example, a scroll bar having a maximum range of 100 through which it may move and residing at halfway along the bar may be referenced by:

```
k: {[scrollBar s: {50, 100}]}
```

Boolean control items such as check boxes, radio buttons, or other boolean control items have a difference between minimum and maximum values of one. Therefore, they only have two states (which is to be expected for a boolean function).

Menu Descriptors

These traits are used to describe the state of a menu on a target machine. The traits are as follow:

t: Used to specify the title of the menu.

o: Used to specify the rank (ordinal value) of the menu in the menu bar. It evaluates a numerical value at run time. For instance, the first menu in the menu bar from left to right will have an ordinal value of one. Subsequent menu items will have a value n wherein n is the number of menus from left to fight of the particular menu.

e: Specifies the enablement of the menu. This evaluates to a boolean value at run time.

i: Specifies the items contained in the menu. It evaluates to a list of menu item descriptors.

An example menu and menu item descriptors is shown as follows:

```
[menu t:'Edit' o: 3 e:true
  i:{   [menuItem t:'Undo' o:1 k:'Z' c:' ' e:false],
        [menuItem t:'-' o:2 k:' ' c:' ' e:false],
        [menuItem t:'Cut' o:3 k:'X' c:' ' e:false],
        [menuItem t:'Copy' o:4 k:'C' c:' ' e:true],
```

-continued

```
[menuItem t:'Paste' o:5 k:'V' c:' ' e:false],
[menuItem t:'Clear' o:6 k:' ' c:' ' e:false],
[menuItem t:'Select All' o:7 k:'A' c:' ' e:true],
[menuItem t:'-' o:8 k:' ' c:' ' e:false],
[menuItem t:'Show Clipboard' o:9 k:' ' c:' ' e:true]}]
```

Figure 4:
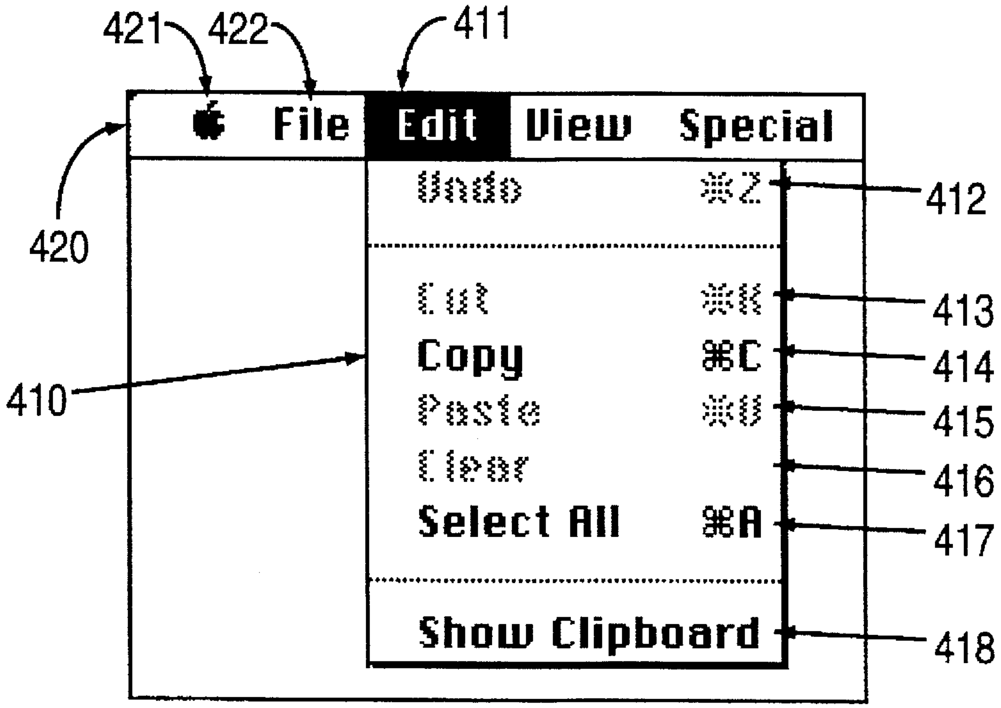
FIG. 4 shows the structure of a "pull-down" menu which may be referenced and manipulated on a target machine by a host machine.

The menu defined by the above series of descriptor statements is shown as 410 in FIG. 4. The menu's title "Edit" is specified by the "t:" option. This corresponds with the name of the menu 411 at the top of screen 400 shown in FIG. 4. Further, the rank of the menu is "3" as specified by the "o:" option because the name "Edit" 411 is the third item on menu bar 420 from left to right after the symbol 421 and the "File" title 422. Because the menu is enabled (it is enabled if the option 411 is not dimmed), the enablement state specified by the "e:" option is "true." Further, items are defined within the menu by the "i:" option. Each of these is specified as follows. The first option 412 has the title "Undo" specified by "t:," an ordinal (rank) of "1" specified by "o:" has a corresponding keyboard equivalent of "Z" specified by the "k:" option as shown in FIG. 4 (see discussion below), and it is not enabled (it is dimmed) as specified by an "e:" option of "false." In contrast, the "Copy" menu item 414 shown in FIG. 4 and the above script example (which has an ordinal value of 4 specified by the "o:" option) has an enablement value of "true." This is because the title for this menu item is not dimmed as shown as 414 in FIG. 4. Similarly, options 415 and 416 are not enabled. The "Select All" option 417 and the "Show Clipboard" option 418 are enabled. The menu item list is terminated by the "}" character.

Figure 5:
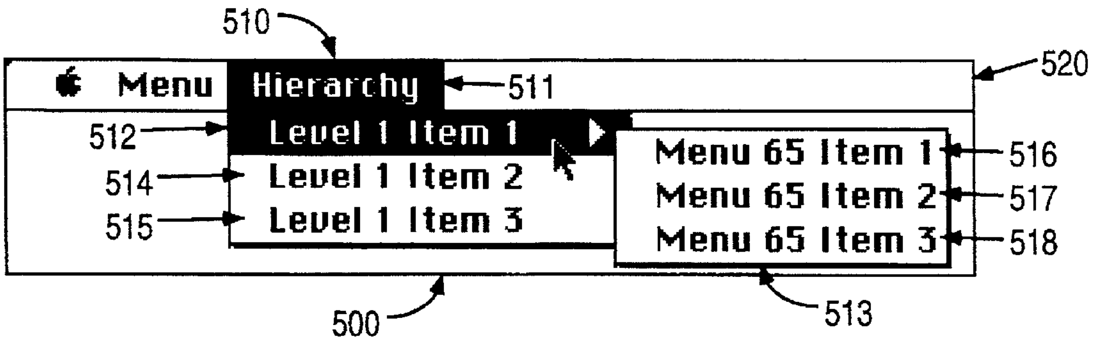
FIGS. 5 and 6 show additional menu items which may be referenced and manipulated in a target machine by a host machine.

For a multiple level hierarchy of menus as shown in FIG. 5, the following series of descriptor statements may be used:

```
[menu t:'Hierarchy' o:3 e:true
    i:{    [menuItem    t:'Level 1 Item 1' o:1 k:' ' c:' ' e:true
                        h:{    [menuItem t:'Menu 65 Item 1' o:1 k:' ' c:' ' e:true],
                               [menuItem t:'Menu 65 Item 2' o:2 k:' ' c:' ' e:true],
                               [menuItem t:'Menu 65 Item 3' o:3 k:' ' c:' ' e:true],
           [menuItem t:'Level 1 Item 2' o:2 k:' ' c:' ' e:true],
           [menuItem t:'Level 1 Item 3' o:3 k:' ' c:' ' e:true]}]
```

As shown in FIG. 5, the items listed above represent the multiple level pull-down menu 510. As shown in FIG. 5, the title "Hierarchy" 511 is indicated by the t: option and the "o:" value for that option, because it is the third title in menu bar 520, is therefore a 3.

The items in that menu are defined using the "i:" option, with the first "Level 1 Item 1" 512 being selected. This is indicated, in the descriptor statements above, by the "h:" option. This option being selected causes the next menu 513 to appear shown in FIG. 5 which is defined as a subset of the first menu item 512 in the descriptor list. The end of each of the descriptors for items 516, 517, and 518 are terminated by "}" character. Then, the remainder of the menu item list for menu 510 showing items 514 and 515 is shown in the descriptor list.

Menu Item Descriptors

Menu item descriptors are used to describe the state of menu items on a particular menu of the target machine. It has traits similar to the descriptors described above, with some menu item-specific traits.

t: Specifies the menu item text.

m: Specifies the entity which owns the item. It usually indicates either the menu which owns the item, or a popup menu which owns the item. It may also be another menu item which indicates that the menu is a hierarchical menu.

o: Specifies the rank of the item within the submenu.

k: Specifies the keyboard equivalent for selecting the menu item. The keyboard equivalent (a specific keyboard sequence) may be entered to select the menu item instead of using the menu item itself.

c: Specifies the "mark" character used by the menu item. It must be enclosed in quotes or double quotes and must evaluate to a string. This is the character which will be visible when the menu item is selected.

e: Specifies whether the menu item is enabled.

h: Specifies whether the menu item is hierarchical or not. If an h: item is specified, then it will be followed with submenu descriptors enclosed within the "{" and "}" characters.

Another example of a statement which may describe a hierarchical menu item in screen 500 is shown using the following statement:

[menuItem t:'Level 1 Item 1' m:[menu t:'Hierarchy'o:3 e:true]o:1 k:' 'c:' 'e:true] The selected menu item 512 corresponds with the hierarchy menu title 511. Therefore, the "m." option in the statement returns a menu with title "Hierarchy" and with an ordinal value of "3." This is used when the script wishes to determine the menu which owns the currently-selected menu item.

Another statement which would be printed to describe "Menu 65 Item 3," shown as 518 in FIG. 5, would return the following statement:

```
[menuItem t:'Menu 65 Item 3'
    m:[menuItem t:'Level 1 Item 1'
        m:[menu t:'Hierarchy' o:3 e:true] o:1 k:' ' c:' ' e:true]]
```

As is shown, the menu item 518 with the title "Menu 65 Item 3" is indicated by its parent menu item 513 "Level 1 Item 1" of menu 510 as indicated by the "m:" descriptor in the text above, and the previous menu title "Hierarchy" 511 is shown as the parent of that menu. It can be appreciated by one skilled in the art that any number of submenus may be uniquely identified in this manner.

Keyboard Descriptors

These items are used to describe the state of the keyboard attached to the target.

t: Specifies the type of keyboard. These are used, in a preferred embodiment, from the Macintosh brand family of computers. The keyboard values for the t: command are derived from the literals defined under keyboardType constant in the publication "Inside Macintosh, Volume V," at page V-8.

| | |
|---|---|
| AExtendKbd | AppleISOKbdII |
| MacAndPad | PortABDKbd |
| StandADBKbd | UnknownKbd |
| AppleKbdII | ExtISOADBKbd |
| MacPlusKbd | PortISOADBKbd |
| StdISOADBKBD | |

These are also defined as having the same literal values in the interpretive language of the preferred embodiment.

s: This is used to specify the "key script" associated with the keyboard. This is used for the Macintosh brand family of computers and is described in more detail in the publication "Inside Macintosh, Volume V," at pp. V-297 to V-298. This is used for specific character sets (such as Arabic or Cyrillic) used by various keyboards of possible target machines.

Mouse Descriptors

These are used to describe the state of the mouse attached to the target.

p: This is used to specify a mouse cursor position. This generates a list of two numerical values contained within the characters "{" and "}." The first value is an x coordinate and the second value is a y coordinate. This is a global position on the screen of the target machine.

b: This indicates whether the mouse button is down or not on the target machine. This value evaluates to a boolean value. "True" means that the button is depressed, and "false" means the button is not depressed.

An example of a mouse descriptor statement is indicated as follows:

```
[mouse p: {234, 187}b:true]
```

In this case, the mouse cursor is at the position x=234 and y=187, and the mouse button is depressed.

Screen Descriptors

The traits for screen descriptors are as follows:

r: This specifies the rectangle are surrounding the coordinate space that the screen is displaying. It has the format:

```
{left, top, right, bottom}
```

For instance, a screen that has a display which is 512 pixels wide by 342 pixels high and whose upper left comer resides at the origin of the graphic system's coordinate space will have the value:

```
[screen r: {0, 0, 512, 342}]
```

m: This is a boolean value used for target computer systems which have a main screen and auxiliary screens. The value is evaluated as "true" if the screen specified is the "main" screen. The main screen will typically have the menu bar such as 520 shown in FIG. 5, and auxiliary screens will be used for displaying other types of data.

Application Descriptors t: This is used to specify the name or title of an application program. Typically, only the active application is accessible. For instance, if a target machine was requested to send the name of the application "MacWrite" which is currently active, then the target would return the following statement:

```
[application t:"MacWrite"].
```

Target Descriptors

These traits are used to describe the state of the target machine.

t: Specifies the target name. This is the "user name" specified by the target in the "Chooser" program of the Macintosh brand operating system software of Version 6.0 and later. This evaluates to a string and allows a target machine to be uniquely identified (assuming that all the targets in a certain zone had unique names).

z: The network "zone" name. Zone names identify an arbitrary set of computers in a network and are described in more detail in the publication "Inside Appletalk" at pp. 8-1 to 8-23.

n: This specifies the target's model name. In the preferred embodiment, these are literal symbolic values which are used for identifying the target machine. These are generally found within the system ROM of the target machine, in the preferred embodiment, which uses the Macintosh brand family of personal computers.

r: This specifies the target machine's RAM (random access memory) size in kilobyte units. This is an integer value.

a: This is essentially the same as the "t:" application descriptor discussed above. This describes the application currently active, however, it is contemplated that in alternative embodiments this option may be used for returning a list of all applications running in the target machine.

s: This specifies a list of screen identifiers.

m: This specifies the state of the mouse attached to the target (see "Mouse Descriptors" above).

k: This specifies the state of the keyboard attached to the target machine (see "Keyboard Descriptors" above).

System Descriptors v: This is used to specify the version of the system software in the target machine.

s: This specifies the system script of the operating system software in the target machine. This is similar to the script described with reference to the keyboard descriptors above, however, it applies to the operating system instead of the keyboard.

Actor Descriptors t: This specifies the name of the actor (see the discussion of actors above). This identifies process associated with a target machine in the host machine.

u: This specifies the name of the target machine under the actor's control.

Time Descriptors y: This specifies a year. It must evaluate to a numerical value.

m: This specifies a month. It must evaluate to a numerical value between 1 and 12.

d: Used to specify a day. This must evaluate to a numerical value between 1 and 31.

h: Used to specify hours/minutes. This is specified using military time, and it is an integer between 0 and 2359.

s: Used to specify seconds. Must evaluate to a number between 0 and 59.

Special Operators Used by the Preferred Embodiment

The script language of the preferred embodiment uses many of the conventions applied by standard programming and/or scripting languages. Many of the commands and syntaxes used in the preferred embodiment are similar to that used in the C programming language with some exceptions. Except for the descriptors and other constructs discussed above, arithmetic operations, the syntax (all statements must end with a ";"), assignment operators (":="), and evaluation rules are handled in a similar manner to the C programming language. Therefore, a detailed description of the scripting language will not be set forth here. However, there are some functions provided by the preferred embodiment in order to evaluate the state of target machines. These include the "match," and "collect" operators.

Match Expressions

Match expressions are used in scripts of the preferred embodiment to return information about an item having a descriptor evaluating to a specified value. In other words, information about a specified target or a specified menu on a target machine may be returned by issuing a "match" instruction with information about that item. For instance, in the example shown in FIG. 3, screen 310 may be evaluated in the following manner:

```
println match [window o:1];
```

This will return the characteristics of the front-most (with the rank or ordinal value equal to one) window on the screen, as shown as 310 in FIG. 300, which has an ordinal value equal to "1." It will return all of the traits, which will be printed out as follows (note that the "print line" or "println" statement has the same effect as that used in the Pascal programming language, i.e., it causes the specified item to be "printed" to the standard output file):

```
[window t:'MacPaint 2.0' s:docment
        o:1 c:true
        z:true g:true
        r:{ 87, 116, 297, 254 ]
        k:[     [scrollBar t:' ' r:{ 87, 237, 281, 23 ] s:{ 0, 0 } e:true],
                [scrollBar t:' ' r:{ 280, 154, 296, 238 } s:{ 0, 0 } e:true]}].
```

In addition, the "match" statement may be used to identify all windows, in this example, having certain values. For instance, the statement:

```
println match [window t:"MacPaint 2.0"];
```

would result in the same values being printed out as above.

In addition, wild card characters (such as the "≈") may be used. So, if a given window or set of windows has certain attributes associated with it, they will each be returned in order. For instance, as discussed again with reference to window 410 in FIG. 4, the statement:

```
println match [window t:/Mac≈/];
```

would result in the same set of descriptor statements as mentioned above. Note that the "match" expression generates only one descriptor, which has the highest ordinal value on the display of the target machine's screen.

Collect Expressions

As an alternative to using a "match" expression, the preferred embodiment provides for generating a list of descriptors for targets or actors having particular attributes. The syntax of the "collect" expression is virtually identical to that of the match expression. Instead, collect generates the list of all descriptors having the specified traits. Therefore, if a collect expression was used with the descriptor "window" in the following manner:

```
println collect [window t:/Mac≈/];
```

then, a list of all the windows shown in screen 300 of the target would be generated as follows:

```
{ [window   t:'MacPaint 2.0' s:document o:1 c:true z:true g:true
            r:{ 87, 116, 297, 254 }
            k:{       [scrollBar t:' ' r:{ 87, 237, 281, 253 } s:{ 0, 0 } e:true],
                      [scrollBar t:' ' r:{ 280, 154, 296, 238 } s:{ 0, 0 } e:true]}],
  [window   t:'AppleLink Folder' s:document o:2 c:true z:true g:true
            r:{ 203, 93, 442, 246 }
            k:{       [scrollBar t:' ' r:{ 203, 229, 426, 245 } s:{ 0, 0 } e:true],
                      [scrollBar t:' ' r:{ 425, 131, 441, 230 } s:{ 0, 800 } e:true]}],
  [window   t:'MacWrite 5.0' s:document o:3 c:true z:true g:true
            r:{ 155, 59, 431, 176 }
            k:{       [scrollBar t:' ' r:{ 155, 159, 415, 175 } s:{ 0, 0 } e:true],
                      [scrollBar t:' ' r:{ 414, 97, 430, 160 } s:{ 0, 48 } e:true]}],
  [window   t:'Applications' s:document o:4 c:true z:true g:true
            r:{ 29, 58, 188, 215 }
            k:{       [scrollBar t:' ' r:{ 29, 198, 172, 214 } s:{ 0, 0 } e:true],
                      [scrollBar t:' ' r:{ 171, 96, 187, 199 } s:{ 0, 48 } e:true]}]}
```

As can be appreciated by the foregoing discussion, this represents all the windows 310, 320, 330, and 340 as shown in screen 300 of FIG. 3. Similar statements may be made for menus, menu items, etc.

Dot Expressions

Particular waits may be obtained from descriptors. These are done, in a manner similar to those techniques currently used in the programming arts, by using the trait as a field of a uniquely identified descriptor to return the value for the trait. This is done using a "dot" operator. For instance, in the example shown in screen 300 of FIG. 3, a series of statements such as follows may be used:

```
x:=match [window o:1];
println x.t;
```

which would produce the following output in the standard output file:

```
MacPaint 2.0.
```

This essentially returns the "t:" "field" of the window with the ordinal value of "1." This is window 310 in screen 300. The "t:" field is the title of the window shown as 314 in FIG. 3.

Controlling Actions of the Target Machine

The control of the target machine is performed in the preferred embodiment by interpreting instructions which identify descriptors residing in the target. Then, the script may manipulate the items identified in the descriptor in various ways. Selecting menus such as the pull-down menus shown in FIG. 4 and 5 in the preferred embodiment is done using the "select" command. The "select" command is used in conjunction with a menu or menu item descriptor in order to either select a menu to be momentarily displayed or to select a particular menu item on a menu and perform that action. For instance, the following command may be issued to cause a pull-down menu to be momentarily displayed:

```
select [menus t:'Tools'];
```

In order to select a menu item, a menu descriptor is used to indicate the appropriate menu to select, and a menu item descriptor under that menu to select. The keyboard selection of the menu item may be emulated if the "k:" option is specified with a boolean value of "true" associated with it. For instance, in order to "pull down" (select) a menu item entitled "Plain" under a menu entitled "Style" using its keyboard equivalent, the following command will be performed:

```
select [menuItem t:/Plain/m:'Style']k:true;
```

Figure 6:
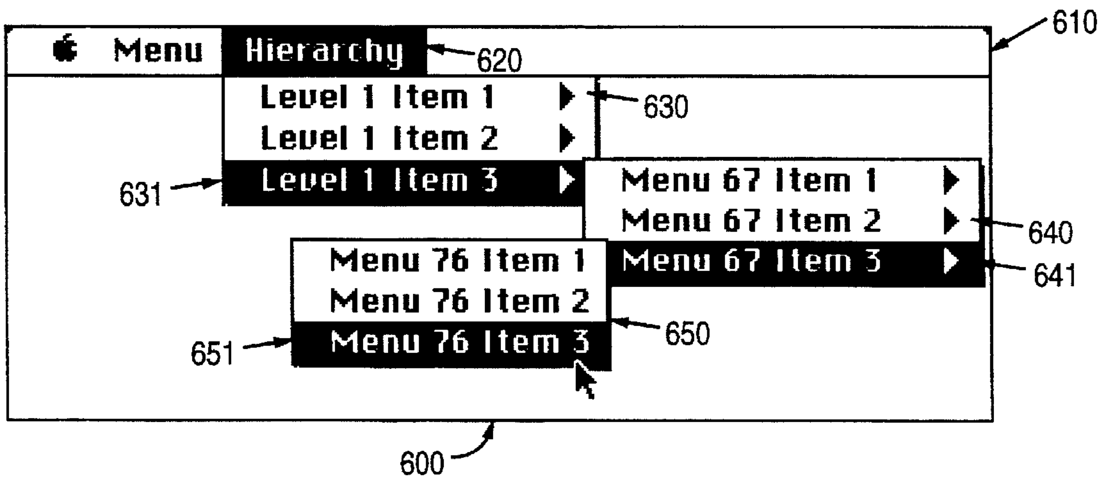

In order to select the item with no keyboard equivalent, then the k: option would be used with the value "false" or not "k:" would specified at all (the default). If the command is specified without the "k:" option, then the keyboard equivalent is not used. As another example, a hierarchical menu may be referenced as is shown in FIG. 6. For instance, the selection of item 651 shown in FIG. 6 may be done using the following "select" statement:

```
select [menuItem t:'Menu 76 Item 3'
    m:[menuItem t:'Menu 67 Item 3'
        m:[menuItem t:'Level 1 Item 3'
            m:[menu t:'Hierarchy']]]];
```

As is shown in FIG. 6, the lower-most menu item 651 is specified first in the select statement. This is specified by the "t:" option used with the title "Menu 76 Item 3." Then, the previous menu item 641 is selected using the statement "m:[menuItem t:'Menu 67 Item 3'." The menu item previous to that "Level 1 Item 3," item 631 is also specified, and the menu title entitled "Hierarchy" 620 is selected using the "m:" option. It can be appreciated by one skilled in the art that using the "select" statement for menus and/or menu items using the descriptors specified above that any menu item in a screen such as 600 may be uniquely described. For instance, another way to uniquely specify menu item 651 in menu 650 is with the following statement:

```
select [menuItem t:'Menu 76 Item 3'];
```

Because the title "Menu 76 Item 3" 651 is unique (the only menu item with this title), this item will be selected.

In another embodiment, a "popup" menu may be selected in a similar manner by substituting the reference to "Menu" for items with "Popup" to select a popup menu with a specific title.

Selecting Windows

Windows are selected in a similar manner by specifying the command "select" followed by a window descriptor. This brings the window selected to the front of the display by issuing a command to the target to click on any exposed region of the window in order to activate the window.

Dragging Windows

In computer systems used by the preferred embodiment, windows may be moved around on the display screen. This is accomplished using the "Drag" command which operates on a descriptor of type window. Depending on the parameters applied to the "Drag" command, different types of movement will be performed on the window.

- a: This specifies that the window should be moved to an absolute position in global coordinates. An x and y value of the new position of the window is specified after the a: option enclosed by "{" and "}." The first value is the x coordinate and the second value is the y coordinate.
- r: This specifies a relative change of position. Two coordinates are specified again delimited by "{" and "}" in the preferred embodiment. This means that the current position is offset by those values.

Sizing Windows

Windows may also be resized by specifying the command "Size" followed by a window descriptor. Several arguments specify how the sizing will be done.

- h: Specifies the window size after the size operation. This valuates to a numerical expression.
- w: Specifies a window's width after the "size" operation.
- r: Specifies a change in size relative to the current size. This is a two numerical value expression enclosed within "{" and "}" which specifies how much the window should be changed in size relative to the current size. The first value specifies the change in width, and the second value specifies the change in height.

Closing Windows

Closing windows may be accomplished by selecting a gadget such as 313 in a window such as 310 of FIG. 3. This is performed using the script language of the preferred embodiment by specifying the command "Close" followed by a window descriptor.

Zooming Windows

This is performed using a similar syntax to closing a window, however, a gadget such as 312 is selected in a window such as 310 shown in FIG. 3 using the command "Zoom."

Scrolling Windows and Other Objects

The command "scroll" is used to scroll windows and other devices which have a scroll bar such as 314 or 315 shown with reference to FIG. 3. This is performed by emulating a user selecting the slider on a scroll bar and moving it to a second position causing text or other data contained within a window to be redisplayed or scrolled to a new position in the document (or other data) in the window. The "scroll" command is followed by a descriptor of type "scrollBar," and then is followed by an argument specifying the type of scrolling to be performed. These arguments are specified by the following:

a: This is an absolute value which is treated as a percentage between maximum and minimum values as discussed with reference to the scroll bar descriptor above. This is a list of two numbers delimited by "{" and "}" wherein the first number is treated as a numerator and the second number is treated as a denominator of the fraction indicating the relative movement of the thumb device in the scrollbar.

r: This is a relative scroll function. It is also treated like a fraction, however, it uses the remaining position left in the scroll bar to determine how much it should move. For instance, the fraction {1, 2} specifies that the scroll bar should be moved 50% of the remaining distance between the current position of the thumb and the end of the scroll bar.

Selecting Boolean Values

Selecting operators such as buttons, radio buttons, and checkboxes on a display may be performed in the preferred embodiment using the "select" command. This is similar to the "select" command used with reference to window descriptors above, however, a control descriptor follows the "select" command. Therefore, the select command will be followed by either a descriptor of type "button," "radio button," or "checkbox." This causes the operator on the display to be selected by the cursor. The effect that this has on the operator depends on the type of operator. For some operators, like buttons, the button state is toggled only momentarily. For checkboxes, the item is toggled from the previous state. For a radio button, the selected button is turned on and other radio buttons are turned off. Each of these conditions may be tested for on subsequent "match" or "collect" expressions. It is contemplated that other operators may be used within the spirit and scope of the present invention.

Typing Characters

Emulating user-typed characters on the target computer is performed by specifying the "type" command followed by one or two arguments. These arguments are:

k: This specifies keystrokes to be typed by the target machine. The option "k:" is followed by a list of items to be typed by the target machine enclosed by a "{" and "}." This may include, among other things, numbers, special characters, or text enclosed within quotation marks. Each of the items in the list enclosed by "{" and "}" is delimited by commas. The following special characters are defined as literals and may also be specified generating the ASCII equivalent:

| | |
|---|---|
| backspaceKey | f9Key |
| capslockKey | f10Key |
| clearKey | f11Key |
| commandKey | f12Key |
| controlKey | f13Key |
| delKey | f14Key |
| downarrowKey | f15Key |
| endKey | helpKey |
| enterKey | homeKey |
| escapeKey | leftarrowKey |
| f1Key | optionKey |
| f2Key | pagedownKey |
| f3Key | pageupKey |
| f4Key | returnKey |
| f5Key | rightarrowKey |
| f6Key | shiftKey |
| f7Key | tabKey |
| f8Key | uparrowKey |

which corresponds to corresponding typeable keys on target machines.

p: This causes the target machine to emulate the use of a numeric keypad on the target. A boolean value follows the "p:" option and indicates whether the numeric keypad should be used or not. When the boolean value following the "p:" option is "true," the numeric keypad is emulated. When false, it uses the standard keyboard. The default does not use the keypad.

PressKey and ReleaseKey

Keyboard data entered with the use of the "type" function are pressed and released in one script statement. To press and release keys separately (over multiple script statements) the commands "pressKey" or "releaseKey" must be used in place of the "type" command. In this manner, keys are held down over multiple script statements, and can be each released individually. Like the "type" command, the "pressKey" and "releaseKey" commands are followed by a "k:" option followed by a series of keystrokes delimited by "{" and "}," each of the keystrokes within the delimiters being separated by commas.

Controlling the Mouse

The control of the cursor position normally performed by the mouse is emulated using the "move" statement. As with moving windows, the move may be either absolute or relative. The "move" command is followed by the requisite "a:" or "r:" options with the mouse positions specified as a list of two numeric values delimited within a "{" and a "}." As with the "move" command applied to a window, the "move" command may be applied to a mouse, followed by {x, y } wherein x is an x coordinate (or a change in the x coordinate if the "r:" option is specified), and y is a y coordinate (or a change in y if the "r:" option is used). Other options for controlling the mouse are done using the commands "Click," "DoubleClick," "PressMouse," and "ReleaseMouse." "Click" is used to emulate a single click of a mouse button within one script statement. "DoubleClick" is used for emulating two rapid clicks of the mouse button in one script statement. This is used to accomplish a selection or activation of certain item(s) on the display screen in order to launch application programs or other functions as is well-known to those skilled in the interactive interface arts. Similar to the "PressKey" and the "ReleaseKey" commands, the "PressMouse" and "ReleaseMouse" commands are used for emulating the depression or the release of the mouse button over several script statements. If a "PressMouse"

command is issued with no corresponding "ReleaseMouse" statement, then the button continues to be emulated depressed.

Heuristic Matching Algorithm

Matching is the process used in the preferred embodiment of finding the intended object(s) in the target to act upon. Matching is performed by a "matcher" in the host computer whenever control of an item in the target is attempted, or the state of the target machine is requested using either "match" or "collect" expressions. Before a user emulated action is performed, the matching method used by the preferred embodiment ascertains the state of various objects in the target by issuing commands (such as SendMouse( ), SendFindWindow( ), etc. discussed below) to the target to determine which objects on the target have the types of items described. Then, the matcher determines which of the items should be controlled using a heuristic matching algorithm. For instance, in order to select or drag a menu item the following examples would be used:

```
select [menuItem t:"Quit"];
drag [window t:"Untitled"] a:{ 100, 100 };
```

In these examples, a matching would be performed prior to control of the items specified in order to perform the desired function. In another example, the match or collect expressions may be referenced directly:

```
first_window:=match [window o:1];
all_menus:=collect [menu];
```

In both cases, a description of the target object (specified using a descriptor) is referenced and the matcher provided by the preferred embodiment must identify the object specified. The matcher finds all of the corresponding objects in the target machine which match the descriptor specified.

The preferred embodiment provides a heuristic matching algorithm for returning information given descriptor traits that are incomplete. In addition, the matcher provides a means for returning descriptors about objects or identifying objects on the display of the target machine when the traits are incorrectly specified. In this situation, the preferred embodiment assigns weights to different traits so that an approximation or "best guess" about the objects referenced may be returned. In this situation, the object with the highest weight is returned. This process will be described with reference to the display screen shown as 700 of FIG. 7.

Window 710 in FIG. 7 can be easily described with the following descriptor statement: [window title:"Window1" o:1 zoom:true closebox:true k: {[scrollbar . . . ], [scrollbar . . . ]}] Knowing what to expect, a script writer may therefore identify window 710 using a statement as follows:

```
select [window title:"Window1"]
```

The marcher can properly identify window 710 using the above "select" statement because there is a unique window present on screen 700 which has the title "Window1." The script statement may omit the remaining traits of the window as specified above because the title uniquely identifies it. Therefore, in this example, there is no ambiguity about the window which is identified by the select statement.

Figure 7:
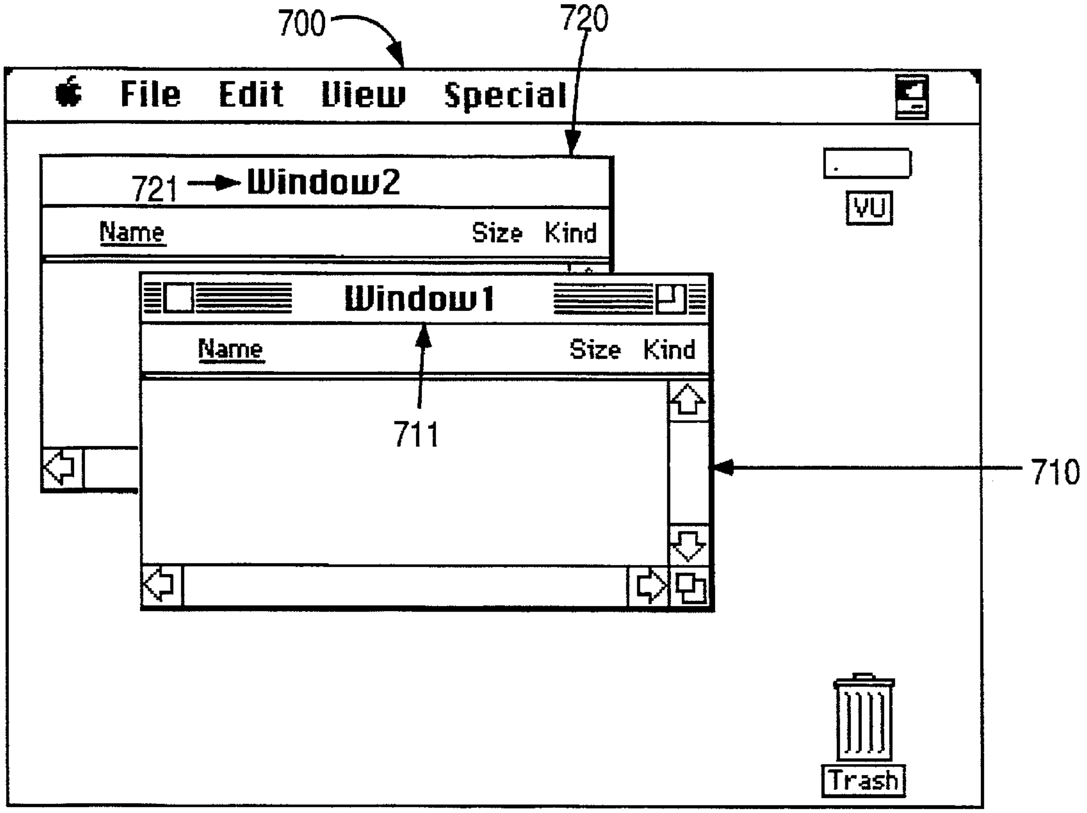
FIG. 7 shows two windows which may be examined for matching user interface traits.

As other examples of attempting to reference window 710 shown in FIG. 7, the following statements may be used:

```
select [window t:"Window"];
select [window t:"Window11"];
select [window t:"1Window"];
```

In the first statement, wherein the statement references the window with the title "Window," the title string in the select statement is not complete but matches six out of seven of the characters in the title ("Window1"). Therefore, the matcher recognizes the fact that there is an 86 percent (6 out of 7 characters) match for this particular trait.

The second statement referencing the window with the title "Window11" matches the title completely for the first seven characters, however, it has one extraneous character "1" which does not match the title of window 710. Therefore, the matcher treats this as a complete mismatch. The third example, referring to the window with the title "1Window" is also treated as a total mismatch because, even though all of the characters match that in window 710, they are completely out of order.

Another situation arises in which a script author specifies multiple traits to be associated with an object, however, one or more of the traits is incorrectly specified. All of the traits incorrectly specified will generate a zero percent match. However, in an example where one or more of the traits are correct, the preferred embodiment uses a technique of weighting. Each trait is assigned a specific weight so that the matching of each trait of a descriptor can be totalled with other weighted trait values for the descriptor. The descriptor with the highest weight will be returned as the matching descriptor. As an example, two windows are displayed on a target machine which have the descriptors as follows:

```
[window t:"Window1" o:1 . . . ](we will call it w1) and
[window t:"Window" o:2 . . . ](we will call it w2)
```

If a user attempts to access the target machine with the following statement:

```
select[window t:"Window1"o:2];
```

This select statement will be technically incorrect. From viewing the w1 and w2 window descriptors above, there is no window displayed on the target machine which has a title "Window1" and has a rank value of 2. However, there is a window with a title "Window1 " and there is a separate window which has a rank of 2. Therefore, the descriptor for either w1 or w2 may be returned depending on the importance placed on the various traits. The importance in the preferred embodiment is accomplished by assigning each trait in a descriptor a weight (significance level) to determine which descriptor is the proper one to be matched. Titles are most important so, in this example, the title field is assigned a weight of 35 and the rank field is assigned a weight of 25. Each percentage of matching in specified fields is multiplied by the weight figure and each of these products is totalled to achieve a total resulting significance matching value for the descriptor expression. For instance, in the "select" statement given above as applied to the windows w1 and w2, w2 would have a higher weight (86% match .35+100% match .25=5510), than w1 (100% match .35+0% match .25=3500). Therefore, window w2 would be returned as the matching descriptor, even though the title is not precisely correct. Each of the traits for descriptors used in the preferred embodiment have predefined weights as specified in Table 1.

TABLE 1

| Trait Weights | | |
|---|---|---|
| **Actor Descriptors** | | |
| name | t | 80 |
| check (mark) character | u | 20 |
| **Application Descriptors** | | |
| text | t | 100 |
| **ContentItem Descriptors (EditText/StaticText/Icon/Picture/UserItem)** | | |
| text | t | 35 |
| enabled | e | 25 |
| rectangle | r | 20 |
| window owner | w | 20 |
| **Control Descriptors** | | |
| text | t | 35 |
| setting | s | 15 |
| enabled | e | 15 |
| highlite state | h | 15 |
| rectangle | r | 10 |
| window owner | w | 10 |
| **Keyboard Descriptors** | | |
| type | t | 50 |
| keyscript | s | 50 |
| **Menu Descriptors** | | |
| title | t | 50 |
| rank | o | 30 |
| enabled | e | 10 |
| items list | i | 10 |
| **Menu Item Descriptors** | | |
| text | t | 35 |
| rank | o | 25 |
| owner | m | 12 |
| keyboard equivalent | k | 10 |
| check (mark) character | c | 9 |
| enabled | c | 9 |
| submenu | h | 1 |
| **Mouse Descriptors** | | |
| position | p | 50 |
| button state | b | 50 |
| **Popup Descriptors** | | |
| text | t | 30 |
| window owner | w | 30 |
| rectangle | r | 10 |
| enabled | e | 10 |
| items list | i | 10 |
| setting | s | 10 |
| **Screen Descriptors** | | |
| main screen | m | 70 |
| rectangle | r | 30 |
| **System Descriptors** | | |
| version | v | 50 |
| system script | s | 50 |
| **Target Descriptors** | | |
| text | t | 40 |
| mouse | m | 10 |
| screen list | s | 10 |
| application list | a | 10 |
| name | n | 10 |
| keyboard | k | 10 |
| RAM (memory) | r | 5 |
| zone | z | 5 |
| **Time Descriptors** | | |
| year | y | 20 |
| month | m | 20 |
| day | d | 20 |

TABLE 1-continued

| Trait Weights | | |
|---|---|---|
| hour | h | 20 |
| seconds | s | 20 |
| **Window Descriptors** | | |
| title | t | 35 |
| rank | o | 25 |
| style | s | 10 |
| close box | c | 6 |
| contents list | k | 6 |
| grow box | g | 6 |
| rectangle | r | 6 |
| zoom box | z | 6 |

In an alternative embodiment, however, trait weights may be variable allowing a user to modify those weights. Therefore, depending on a particular operating context, a user may modify the trait weights for a title or name field, for instance, thus giving a matching of that trait more significance than a match of a second trait, such as the rank trait.

Another scheme performed by the preferred embodiment is the use of significance thresholds. For instance, in the example given above, if the significance threshold was 35, then the window title would be given priority over the rank trait. When a significance threshold is set, in the preferred embodiment, the heuristic matching algorithm first checks any and all traits with weights greater than or equal to the significance threshold, and will not test any of the non-significant traits (those having weights less than the significance threshold), if any of the significant weights returns a zero percent match (no match at all). If any of the significant traits is a zero percent match, then the entire match total is treated as if it were zero. This feature therefore gives the significant traits veto power over the remaining traits. Once a matching of a descriptor has been done, the appropriate command is issued to the target to cause the proper object to be referenced.

Processing of User-Generated Scripts

Interpretation of the scripts of the preferred embodiment is implemented by the host computer at run time using parsing techniques well-known to those skilled in the art. The director maintains the state of each of the target machines in data structures retained in the host. Therefore, the current (or hopefully the most current) state of the target machine(s) is maintained in a data structure maintained by each actor. Updates to these data structures are performed at periodic intervals when the host requests information from the target machine(s) either as a result of the control of an item or a result of a "match" or "collect" expression. When a script command is interpreted by the host, the action is directed to be performed on the target using a series of basic commands issued to the target machine. Communication is provided with the target via a network such as the Appletalk brand network manufactured by Apple Computer, Inc., using the Appletalk Transaction Protocol (ATP) brand protocol.

Commands Issued by the Host to the Target

In the Macintosh brand computer system, the state of most user interface objects shown on the display of the machine is accessible through a series of low memory global data structures in the memory of the machine. This enables the system to place the cursor and cause other activities to occur when the frame buffer in the target is updated. A program is run within the target to communicate with the actor in the host system which controls the target. In the Macintosh brand operating system running on targets of the preferred embodiment, this routine is initiated at computer system bootstrap initialization when the computer system checks for certain types of programs known as "INITS" or "system extensions" in the directory entitled the "System Folder." The target program known as an "agent" communicates with the "actor" in the host by accessing data structures in the target while running in the background of the target during normal system operation. Messages sent to the target are directed towards a "socket" (a process identified in the target, see "Inside Appletalk," at pp. 9-18 to 9-20), and the agent interprets the commands issued over the network 110 in order to perform the desired function. These functions are performed by the agent at network interrupt time or during a periodic time allocated to drivers in the computer system of the preferred embodiment. These functions may include, among other things, emulating a mouse movement, typing text, or determining the state of user interface objects, or the operating condition of the target. These functions are performed when the host processor issues certain basic commands which can be performed by the target machine.

The agent program in the target machine is controlled by actors in the host machine. Actors may issue commands to the agent program in the target in order to cause the target perform certain actions. These include returning information about the target or causing the target to perform a certain action. Commands that cause a target to return information return the information as an abstraction or representation of the object(s). In other words, screen bitmaps of graphical user interface objects used in target machines of the preferred embodiment are not returned, but instead, positions, titles, highlighted states, etc. (as discussed with reference to descriptors above) may be returned instead of the bitmap representation itself. Commands issued to the targets by actors in the host include the following:

SendMouse

This routine returns the current position of the cursor on a display screen of the target. It returns the current position as two integer values in the response transmitted over network 110. The host processor knows that the next response from the target machine containing the socket number of the agent program in the target will contain the x and y values of the cursor position. As mentioned with regards to the screen display and cursor script commands, the value is given as the x coordinate preceded by the y coordinate. The coordinate may be either an absolute (global) or local coordinate (relative to a window on the screen) if certain parameters are specified. The parameters issued via the "SendMouse" command are as follows:

WantGlobal—This is a boolean value indicating that global coordinates are desired. If this value evaluates to "false," then coordinates relative to a current window (called "local coordinates") are returned. Otherwise, the absolute screen location of the cursor is returned.

TargetMouse—This is the pointer to the x and y values returned by the agent program in the target to the actor program in the host.

ReturnSizeP—This is the size of the return value(s) generated by this routine. The host may examine this value to determine how much of the datum residing at position TargetMouse must be read.

The "SendMouse" routine is a function call, so that a return of a non-zero value indicates that the send mouse command failed. In this case, an error code is returned, which is decoded according to certain constants definitions defined for the host routine.

"SendMouse" operates by examining certain global variables contained within the low memory region of the target computer. These low memory global variables are maintained by the Macintosh brand operating system. For example, the cursor position information can be obtained from the global variable MOUSE. The state of the mouse button (up or down) is obtained from the global variable MBSTATE, which evaluates to either "true" or "false." In order to generate local information for the mouse, if the "WantGlobal" flag is true, then "SendMouse" examines the coordinates of the mouse relative to specified GRAFPORTS in the system which define windows on the display of the target. Therefore, if the "WantGlobal" flag is false, and the cursor position is within the bounds of given window defined by a grafport, then the position returned to the host machine is relative to the grafport in which the cursor is found.

PutMouse

This routine moves the cursor mouse position to the position specified. This routine has the following parameters:

TargetMouse—A pointer to a datum describing the desired position and button state of the mouse.

ReturnSizeP—Size of the returned value generated by this procedure.

moleVars—This is a data structure set up by the agent which maintains, among other things, the file descriptor of the "uinter" (user interface) driver for the AUX (the Apple brand version of the UNIX operating system) operating system.

The "TargetMouse" variable points to a structure containing the x and y values of the new mouse position. In addition, the structure contains a boolean value indicating the desired button state after the mouse has been moved to its position. The value is a one-bit value containing a one or "true" value if the button is desired to be depressed, and it contains "false" or zero if it desired to be released. Any previous states of the mouse are modified to the current values. These are performed by modifying the global variables RAWMOUSE, MTEMP, and MOUSE, MBSTATE, and MBTICKS in the low memory area of the target machine. In addition, the variable CRSRNEW is modified indicating that the cursor position needs to be updated on the next interrupt during the display's vertical blanking interval of the target machine. This routine will pass an error condition to the host processor if the cursor position attempted was outside the range of the currently defined screen limits.

Figure 8:
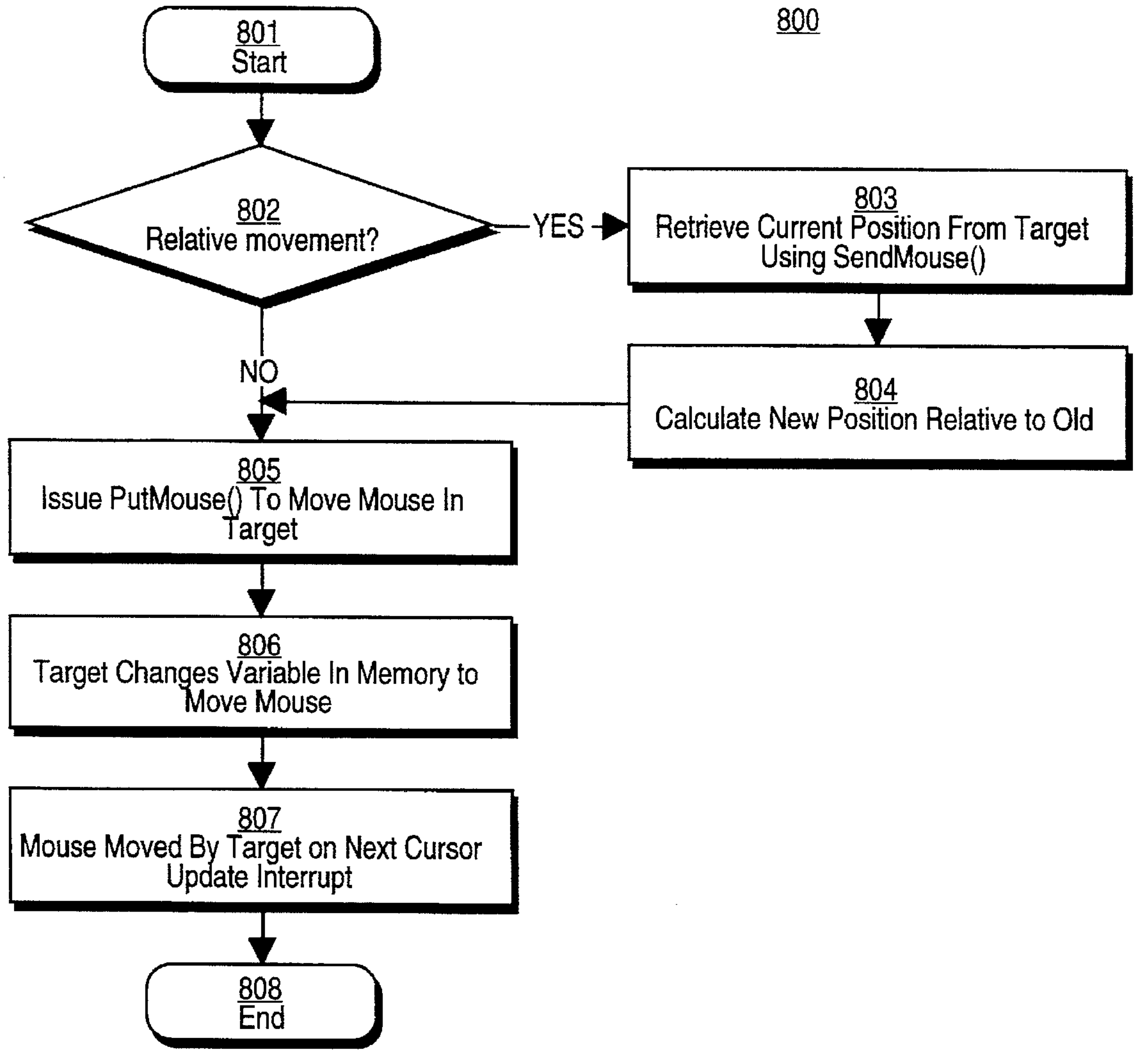
FIG. 8 shows a flow diagram of a host machine process used to update a cursor position in a target machine.

Using the routine "PutMouse," the preferred embodiment allows mouse movements and selections (including selection of pull-down menus and other user interface objects) to be emulated on the target machine. One such movement function directed by the host to be emulated by the target computer is shown in a flow diagram shown in FIG. 8. Step 802 determines whether the position of the mouse is a relative movement or an absolute movement according to the "r:" or "a:" options specified in the "Select" command. If it is a relative movement, then steps 803 and 804 are executed in order to determine the current mouse position of the target machine's cursor using the routine "SendMouse( )." Then, using the new position specified in the "Move" command in the script, and the old position retrieved from the target machine, a new position is calculated at step 804 by summing the relative position with the absolute position retained in the low memory data structures of the target machine.

If it was not a relative movement, as determined at step 802, or step 804 is complete, process 800 proceeds to step 805 wherein the routine "PutMouse( )" is issued to move the mouse to the absolute position specified by the actor in the host. Then, using the variables specified in the call to "PutMouse( )," at step 806, the target updates the variables contained within the low level memory location(s) such as "RAWMOUSE," "MTEMP," and "MOUSE" at step 806 to emulate user movement of the mouse. Upon the next display update in the target machine, as shown in step 807, the mouse position is actually moved on the target machine's display. This may be confirmed in a subsequent operation if the host issues a "SendMouse( )" command to the target. Process 800 then ends at step 808.

Mouse down and mouse up operations indicated by operations such as "Click," "DoubleClick," "PressMouse," and "ReleaseMouse" in the preferred embodiment are handled by posting events to event managers contained within the Apple Macintosh brand operating system. These are done by calling operating system routines such as the function "PostEvent" which adds an event such as a mouse up/mouse down action which gets posted to the event queue of the operating system. The operating system event manager is found and discussed in more detail in the publication "Inside Macintosh, Volume IV" (1986) at page IV-85. Mouse down and mouse up operations are indicated to the target to be performed by a boolean pointed to by TargetMouse.

PutMouseString

This routine receives a pointer to an array of "PutMouse( )" parameter blocks and a parameter for returning error codes. It calls the routine "PutMouse" as a series of positions and button states to perform gestures like double clicking which need to be performed within a certain time threshold. It modifies a system variable entitled TICKS which resides in the low memory area of the memory of the target computer in order to emulate the double clicking action by a emulated user. This is done, in the manner described above, using "PutMouse" to posts events to an event queue for processing by the event manager. This error routine returns an error cede if it is not successful, and it returns a "successful" if the routine successfully completes the performance of the operation.

EnterKeystroke

The parameters of this routine include:

keyCode—The character to be entered on the keyboard.

outBuffP—Currently unused.

returnSizeP—Size of the return value returned by this routine.

moleVars—This is a pointer to the global variable parameters to the EnterKeystroke( ) routine.

The following variables are contained within the area pointed to the by the moleVars variable above:

ADB_LENGTH—This is a length variable for the string passed to the keyboard driver in the target machine.

ADB1—This is first keyboard key cede for the target machine.

ADB2—This is the second key code, if there is any.

V_KEY—This is the virtual key code for Macintosh Plus brand computer systems.

ASCII_KEY—This is not used in later versions of the Macintosh brand target computer systems.

DOWN_STROKE—Used for Macintosh Plus brand computer systems and is a boolean value containing true if the key is being depressed. It is false if the key is being released.

The "EnterKeystroke" routine is used to call the standard keyboard driver of the target computer system such that keyup and keydown states by a user are emulated on the target. Keystrokes are fed to the target using the Apple Desktop Bus brand manager routines. These are more discussed in more detail in the publication,"Inside Macintosh, Volume V" at pages V-367 through V-373. A pointer is passed to the target machine which references the area of memory containing the strings which have the keystroke sought to be emulated on the target machine. The string which is pointed to by the parameter value is a standard string wherein the first byte contains a length value, and the next byte contains a key code whose first bit reflects whether the key is up (a one) or down (a zero). Depending on the length value, subsequent bytes can contain key codes as well. Multiple keystrokes are entered by calling EnterKeystroke( ) multiple times.

A number of other commands are provided in order for the host to direct the target machine to perform a specified action. Although a description of the parameters of the following actions will not be described, a summary of these commands will be set forth in order to provide a complete understanding of the features provided by the preferred embodiment in order to cause the target to perform actions directed by the host. These commands are as follows:

SendStatus

This provides the host with the means of identifying potential targets attached to the network and confirming the existence of an already active agent program running in target machines. Each of the agents residing in target machines returns status information about the agent in the system on which it is running. The host may then build a structure to maintain communication between all the target machines coupled to network 110.

SendBlock

This routine causes the target machine to send up to 512 bytes from the target machine's memory.

SyncSendBlock

This is the same as the SendBlock command, however, it is executed at system task time rather than network interrupt time when normal commands are executed. This allows synchronization with events occurring in the target machine to make sure that the values contained in those locations are valid.

SendHBlock

This also sends up to 512 bytes from the target system's memory. As opposed to SendBlock and SyncSendBlock which access memory through a pointer, it accesses the memory through a handle (a pointer to a task).

SendMenuInfo

This loads the return buffer with information about the menu having a particular rank. The rank is determined by the matcher.

SendMenuItem

This routine causes the agent process in the target to seek out the menu containing the attributes as specified in the SendMenuInfo command, and return the mark character, icon, and command key equivalents for the menu items. A menu item is identified by rank determined by the matcher.

SendFindWindow

This routine returns information about the window currently under a point specified in global coordinates. If there are no windows under the cursor or the window belongs to a background task, then information about the front-most window is returned by default. If the point is over a window that belongs to the foreground (active) task but is not an active window, then information is returned about that window. This routine calls the Macintosh's window manager program "FindWindow" to determine attributes of the window specified by rank. The rank is determined by the matcher.

SendWindowInfo

The target machines scans through all the windows in the memory in the target and returns the information about the window having the rank specified.

SendControlInfo

This command returns information about the specified control from the target machine. The control is specified by the rank of the window owning the control and the control rank within the window. These are specified in the data structures of the target machine, as discussed above.

SendFindDItem

This command returns information about a dialog item which is under a specific point in global coordinates. Global coordinates are passed to the agent in the target machine, and the command determines whether there is a window under those coordinates. If that succeeds, and the window is a dialog window, then it determines the position of the dialog item under the specified point.

SendDItemInfo

This command sends back information about a dialog item which is specified by the host. The item is specified by a window rank and an item rank number. The information returned includes the type of item, whether the item has text associated with it, etc.

SendNextEvent

This routine returns the record of the next pending event in the event queue of the target machine. These may include, among other things, keyboard and/or mouse movement information. This program emulates the routine GetNextEvent( ) which is used for servicing events in Macintosh brand operating system programs. This program returns a record known as a "event record" which tells the host machine the current pending action in the target machine. This may be used to synchronize operations between host and target machines and is typically used in the preferred embodiment to determine if simulated input events have been processed to avoid issuing new events to the Event Manager.

SendResPeek

This routine returns the resource data for a "resource" having a specified type and identification value. Resources are items used in the preferred embodiment Macintosh brand operating system for defining various objects such as menus, windows, etc. These are discussed in more detail in the publications "Inside Macintosh, Volume I," at pages I-103 through I-132, "Inside Macintosh, Volume IV," at pages IV-15 through IV-21, and "Inside Macintosh, Volume V," at pages V-29 through V-37. The resource information is passed back up to the maximum length of the packet transfer buffer, which is approximately 512 bytes in length.

SendIconHeight

This routine returns the height of the icon in pixels specified by an icon resource I.D.

SendScriptInfo

This sends the system, application, and keyboard script currently running on the target machine.

SendCurrKCHRid

This routine returns the KCHR (keyboard mapping table) I.D. which is currently in use on the target machine.

Although the foregoing is a brief description of the current commands available by the host to execute on the target, it is contemplated that other commands performing operations on the target, or commands seeking state information about the target are contemplated within the spirit and scope of the present invention. These examples are set for illustration purposes only, and should not be viewed as limiting the present invention.

Commands that are used to determine the current state of the target machine, causes the target to access data structures contained within the target and return the values of requested items in these structures in a predefined format understood by the actor thread in the host. These values are returned to the host and pointed to by the parameter list pointer "moleVars." For instance, in order for the host to determine the status of a window with a specified title, the data structures containing window description information are scanned by the marcher using rank through a series of SendFindWindow( ) commands until a window with the highest total matching value is determined. Then, this window is referenced by rank. Examples of data structures used in target machines such as the Apple Macintosh brand operating system are found in the publication "Inside Macintosh, Volume I" at pages I-269 through I-308. Then, the attributes of the window may be returned to the host using the moleVars pointer returned in response to the SendFindWindow( ) command for the rank specified. A detailed description of the data structure used for windows displayed on target machines in the Apple Macintosh brand operating system is shown in the publication "Inside Macintosh, Volume I" at page I-276. The remaining system state information commands such as determining menu information, determining menu items, determining the current active window, among others, may be performed in a similar manner when the agent process in the target machine scans other data structures similar to that of the window record data type shown in the publication "Inside Macintosh, Volume I" at page I-276. For instance, the controls for windows may be referenced as is set forth in the publication "Inside Macintosh, Volume I" at pages I-311 through I-334, or "Inside Macintosh, Volume V" at pages V-225 to V-258.

More complex functions such as selecting windows, selecting menus, closing windows, resizing, scrolling, etc. as is set forth in the scripting language above may be performed by ascertaining the current position of the object (or control) to be moved on the display of the target machine using the appropriate command (such as SendMouse( ), SendFindControl( ), SendFindWindow( ), etc.), and then issuing basic commands to cause the desired action. For instance, with reference to FIG. 9, a "Resize Window" instruction specified in the script language of the preferred embodiment, process 800 may be performed.

Figure 9:
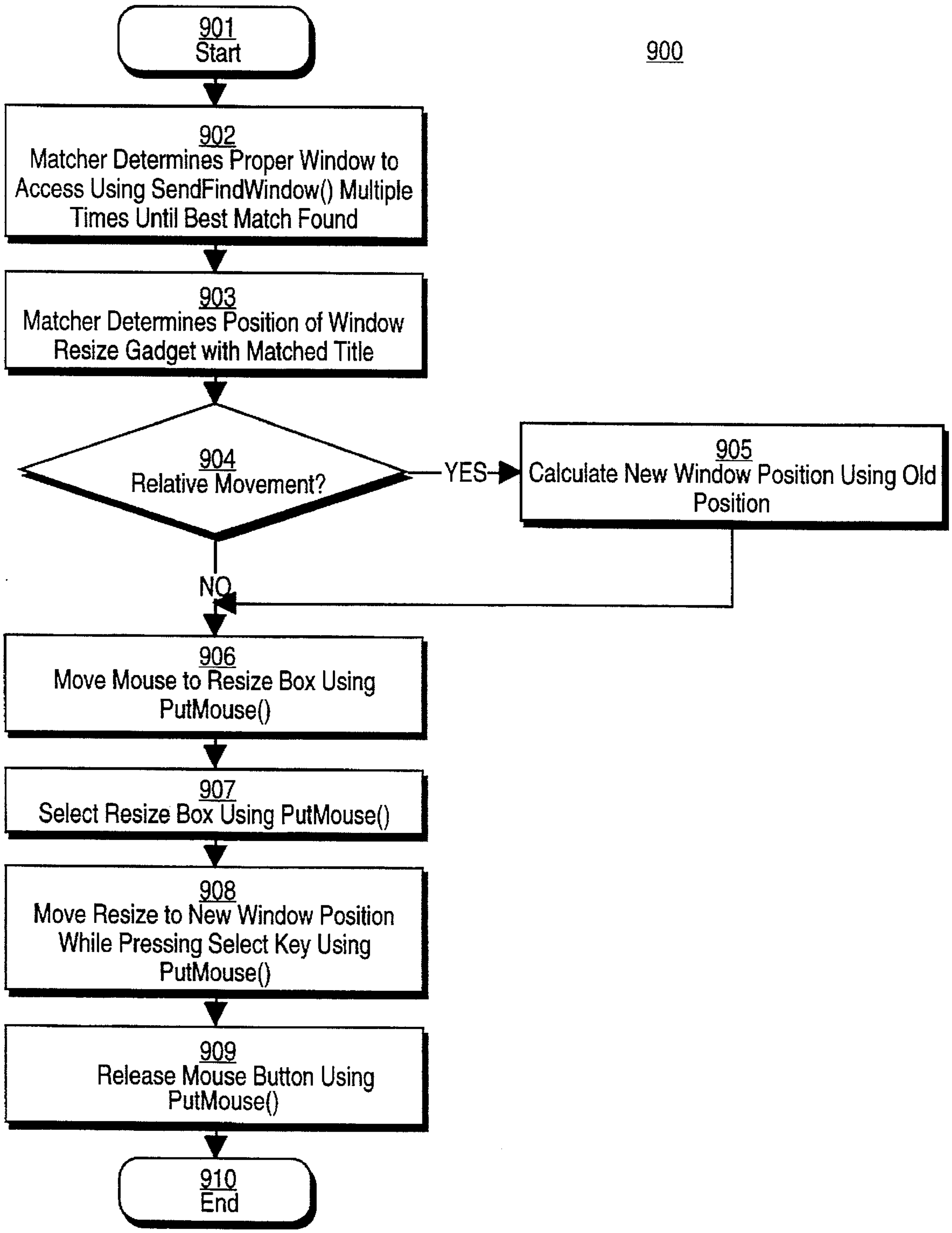
FIG. 9 shows a flow diagram of a host machine process used to resize a window in a target machine.
Figure 10:
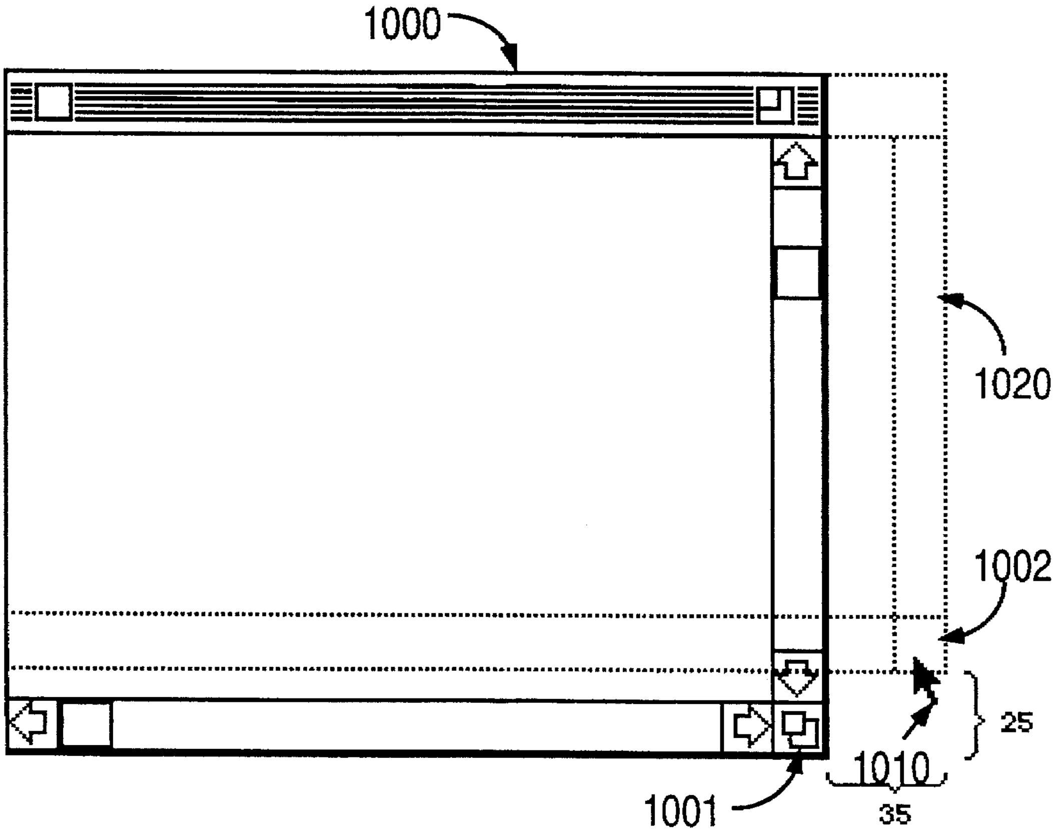
FIG. 10 shows an example of resizing a window in a target machine.

For instance, as shown in FIG. 9, the matcher determines the appropriate window to control by issuing SendFindWindow( ) instructions multiple times until the correct window with the highest total trait weight is ascertained at step 902. Once determined, the matcher again determines the position of the resize gadget at step 903. This may be done by assuming that the resize gadget resides at the lower right hand position of the window. This will determine the position of the resize gadget 1001 of a window such as 1000 shown in FIG. 10. Once the resize gadget has been determined, it again is determined at step 904 whether this is a relative movement or not. If it is a relative movement, then the new position of the window resize box will be calculated at step 904 using the control position determined at step 903. If not, step 904 proceeds to 906. 906 will move the cursor such as 1010 shown in FIG. 10 to the position of the resize box such as 1001 shown in FIG. 10 using the PutMouse( ) command discussed above. At step 907, the resize control 1001 is selected using PutMouse( ). While the mouse key continues to be depressed, as indicated by the PutMouse( ) command, the cursor 1010 is caused to move to the new position 1002 using PutMouse( ), at step 908. In the example shown in FIG. 10, the mouse has been moved by an x value of 35 and a y value of 25. Once at the new position 1002, the mouse button is released at step 909 using the PutMouse( ) command, and process 900 ends at step 910. Thus, window 1000 has now been resized to a new size 1020 shown in FIG. 10, such that its resize control resides at the new position 1002 shown in FIG. 10.

It can be appreciated by one skilled in the art using a combination of "Send" commands which determine the status of the target machine and "Put" commands for either moving the mouse or "Enter" commands for entering text into the window of the target machine, that virtually any user input functions may be emulated on a target machine using a combination of keystroke entry commands and mouse movement commands. The determination of whether the command was successful or not can be ascertained by issuing the appropriate "Send" command(s) at the termination of the operation in order to determine the state of windows, menus, mouse positions, or other information retained on the display of the target system.

Maintaining Communication Between the Host and Target Systems

Communication is provided between the host and target machines using a transaction processing protocol known as ATP (the Appletalk Transaction Protocol brand protocol). Although a detailed discussion of the transaction protocol of the preferred embodiment will not be set forth here, it can be appreciated by one skilled in the art that using this protocol (see "Inside Appletalk, Second Edition," at pages 9-1 through 9-28), that calls can be made to routines (such as SendMouse( ), PutMouse( ), etc.) in the target machine, and responses to queries may be made back to the host machine. Specifically, the actor in the host machine, and the agent in the target machine, establish communication via a "socket" for passing messages. Communication is provided using the routine "PNSendResponse" specified in the above reference. Contained in each call between the agent and host process is an opcode for the desired command, and a pointer pointing to the parameter data or the result data passed between the two machines. In addition, a pointer is provided to an error number, and if the function fails, an error number greater than zero is returned to the actor controlling the target. The parameter block transferred using ATP in the preferred embodiment contains the following data:

| | |
|---|---|
| userData | The command selector or opcode (2 bytes) followed by the result code (2 bytes) |
| bdsPointer[0].dataSize | The size of the response data |
| bdsPointer[0].buffPtr | Pointer to the response data |
| bdsPointer[0].userBytes | The command selector (2 bytes) followed by the result code (2 bytes) |
| ioResultf | ATP result of the request call |

userData contains the command selector or opcode. The opcodes or command selectors for each of the commands and are as set forth below:

| Command Name | Opcode |
|---|---|
| AbortPendingCmd | −1 |
| SendStatus | 0 |
| GoOffLine | 1 |
| ComeOnLine | 2 |
| SendBlock | 3 |

-continued

| Command Name | Opcode |
|---|---|
| SendBlockSize | 5 |
| SendMouse | 6 |
| PutMouse | 7 |
| EnterKeystroke | 8 |
| SendMenuInfo | 9 |
| SendMenuItems | 10 |
| SendFrontWindow | 12 |
| SendFindWindow | 13 |
| SendWindowInfo | 14 |
| SendFindControl | 15 |
| SendControlInfo | 16 |
| SendFindDItem | 17 |
| SendDItemInfo | 18 |
| SendResPeek | 19 |
| SyncSendBlock | 20 |
| SendNextEvent | 21 |
| SendHBlock | 22 |
| PutMouseString | 23 |
| SendIconHeight | 24 |
| SendScriptInfo | 25 |
| SendCurrKCHRid | 26 |

Once the target machine decodes the command selector embedded in the variable "userData," the command opcode or command selector is used to decode the remaining parameter data contained within the buffer area pointed to by bdsPointer[0].buffPtr.

Session Commands

The host processor provides communication with the target system via a special series of commands used with ATP and as specified by the preferred embodiment. The three commands are:

ComeOnLine;
GoOffLine; and
AbortPendingCmd.

Figure 11:
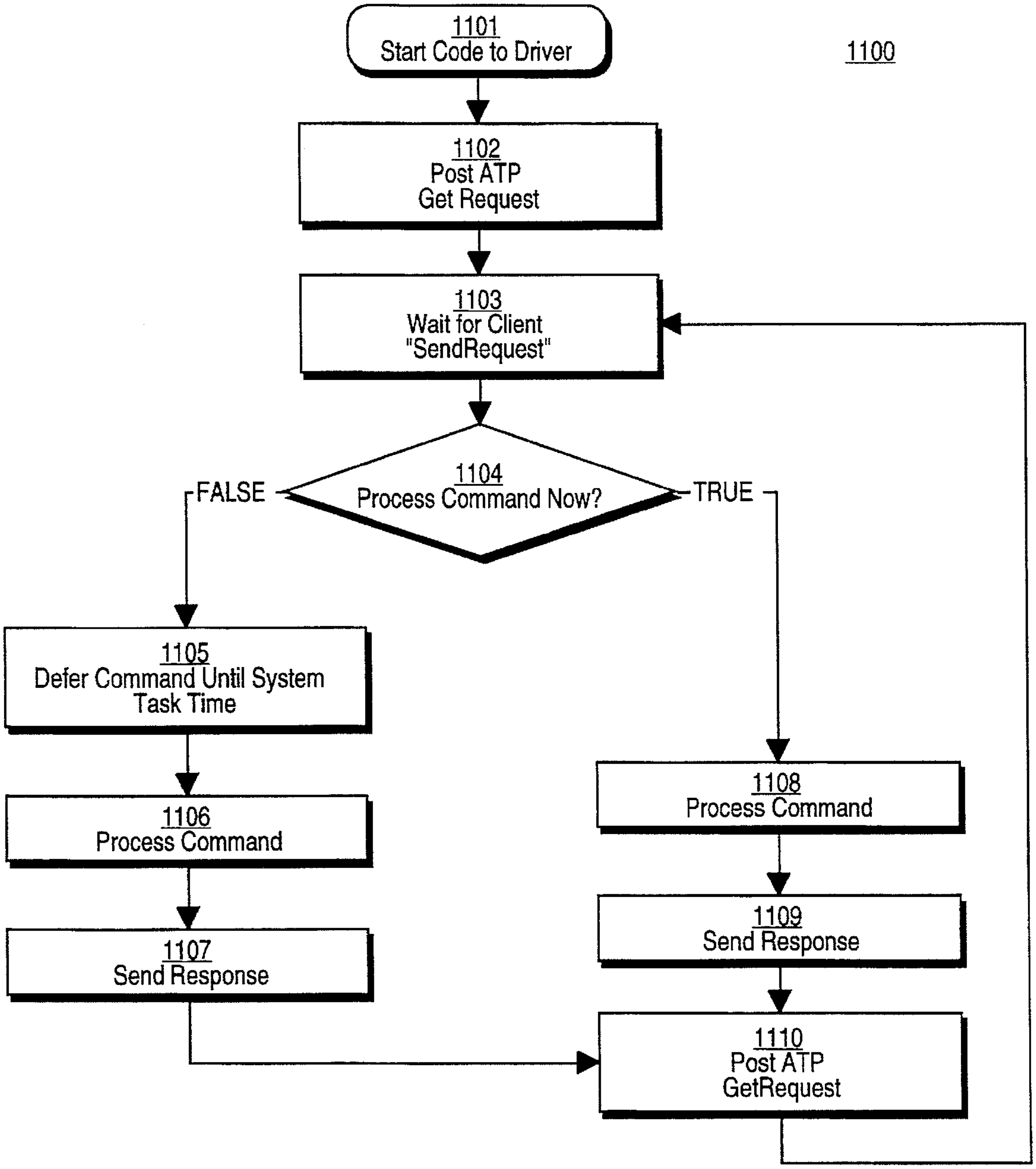
FIG. 11 shows a communication scheme utilized by the target machine for communicating with the host.

ComeOnLine is a command issued by the host to the target to execute the low level procedure originating from the host machine. This is graphically shown in FIG. 11. At initialization time, the code to the agent driving routine is started at 1101, and the Appletalk protocol "GetRequest" will be initialized at step 1102. The process then waits at step 1103 for the client routine (the actor for the target) to issue a "send" request at step 1103. If the process is desired to be processed now as determined by the priority in the ATP protocol determined at step 1104, then the command is processed at step 1108, any responses are sent back to the client at step 1109, and the Appletalk protocol is posted with the next "GetRequest" at step 1110. Then, the next "SendRequest" is waited for at step 1103. If, however, the command cannot be processed now as determined at step 1104 (depending on the type of command), command execution is deferred until system task time at step 1105, and the command is processed at step 1106 with a response being sent at step 1107. Some commands are always executed at network interrupt time while other commands are always executed at driver time. This is to ensure that data in the target is in a determinant state (e.g. it is not in the process of being modified). The proceeding routine is executed by the agent process wherein it receives a request from the host to "ComeOnLine" by issuing that command via a "Send" request from the client process in the host computer. Once the agent has come "on line," it is listening for any commands to be sent to the agent's socket number, and the command received from the host is thereby executed. Once executed, the agent will stay listening on the network for messages to be sent to its socket number, until a "GoOffLine" command is issued by the actor in the host. Because an agent may only listen to one client process at a time, once a "ComeOnLine" command is issued to an agent process residing in the target machine, it may receive messages from no other hosts on the network (this is true for all command except "SendStatus" which the target will respond to if issued by any host).

Thus an invention for remote testing and diagnosis of computer systems has been described. Although this has been described particularly with reference to FIGS. 1 through 11 and the specific embodiments thereof, it is contemplated that many changes and/or modifications may be made by someone skilled in the art and remain within the present spirit and scope of the present invention.

What is claimed is:

1. An apparatus for testing a first computer system, the first computer system having a memory, a display and an operating status, the display displaying a plurality of user interface objects, the memory storing a plurality of abstract representations of said plurality of user interface objects, wherein each abstract representation of said plurality of abstract representations represents a corresponding user interface object of said plurality of user interface objects, wherein each abstract representation of said plurality of abstract representations includes data indicating a state of said corresponding user interface object, the apparatus comprising:

a. emulating means for causing the first computer system to respond as though a user had interacted with the first computer system in a predefined manner in an absence of actual user interaction in the predefined manner, and b. determining means for determining the state indicated by said data stored in said abstract representation of a user interface object of said plurality of user interface objects and for determining the operating status of the first computer system.

2. The apparatus of claim 1 wherein the emulating means comprises a keyboard emulating means for causing the first computer system to respond as though the user had entered keyboard input on the first computer system.

3. The apparatus of claim 2 wherein the keyboard emulating means comprises a means for issuing events to an event handling means in the first computer system.

4. The apparatus of claim 1 wherein the emulating means comprises a mouse emulating means for causing the first computer system to respond as though the user had entered mouse input on the first computer system.

5. The apparatus of claim 4 wherein the mouse emulating means comprises a means for emulating mouse movement and a means for emulating depression of a mouse selection key.

6. The apparatus of claim 5 wherein the means for emulating mouse movement comprises a means for updating a plurality of data structures stored in said first computer system.

7. The apparatus of claim 5 wherein the means for emulating depression of the mouse selection key comprises a means for issuing events to an event handling means in the first computer system.

8. The apparatus of claim 1 wherein each user interface object of the plurality of user interface objects has one or more attributes, the plurality of user interface objects including a plurality of windows, a plurality of menus and a cursor, the determining means comprising:

a. a means for determining the attributes of the plurality of windows;

b. a means for determining the attributes of the plurality of menus; and c. a means for determining a current position of the cursor.

9. The apparatus of claim 8 wherein the memory stores said plurality of abstract representations in a plurality of data structures, the means for determining the attributes of the plurality of windows, the means for determining the attributes of the plurality of menus, and the means for determining the current position of the cursor comprising a means for reading the plurality of data structures.

10. The apparatus of claim 1 wherein the apparatus comprises a second computer system that is coupled to the first computer system.

11. The apparatus of claim 1 wherein the operating status of the first computer includes a type of processor contained in said first computer wherein the determining means includes means for determining the type of processor contained in said first computer.

12. The apparatus of claim 1 wherein the operating status of the first computer includes a version of an operating system running on said first computer, wherein the determining means includes means for determining the version of the operating system running on said first computer.

13. The apparatus of claim 1 wherein the operating status of the first computer includes a current application running on said first computer, wherein the determining means includes means for determining said current application running on said first computer.

14. A system for testing computer systems, the system comprising:

a. a host computer system for transmitting information directing emulated user actions and for receiving user interface object information; and b. a target computer system coupled to the host computer system, the target computer system having a display, the display of the target system displaying a plurality of user interface objects, the target computer system receiving the information directing emulated user actions from the host computer system, the information directing emulated user actions causing the target computer system to respond as though a user had interacted with the plurality of user interface objects in a predefined manner in an absence of actual user interaction in the predefined manner, the target computer system transmitting user interface object information indicating a status of said plurality of user interface objects to the host computer system, the user interface object information being an abstract representation of said plurality of user interface objects.

15. A system for testing computer systems comprising:

a. a first target computer system having a first hardware/software combination, the first hardware/software combination including a first display displaying a first plurality of user interface objects, the first hardware/software combination including a first memory storing a first plurality of abstract representations of said first plurality of user interface objects;

b. a second target computer system having a second hardware/software combination, the second hardware/software combination including a second display displaying a second plurality of user interface objects, the second hardware/software combination including a second memory storing a second plurality of abstract representations of said second plurality of user interface objects;

c. a host computer system for causing the first target computer system to perform a first set of tests and for causing the second target computer system to perform a second set of tests, the first set of tests causing the first target computer system to respond as though a user had interacted with the first target computer system in a first predefined manner in an absence of actual user interaction in the first predefined manner, the second set of tests causing the second target computer system to respond as though a user had interacted with the second target computer system in a second predefined manner in an absence of actual user interaction in the second predefined manner, the host computer system causing either the first target computer system to transmit data representing said first plurality of abstract representations back to the host computer system, or the second target computer system to transmit data representing said second plurality of abstract representations back to the host computer system; and d. communication means for coupling the host computer system to the first and second target computer systems.

16. The system of claim 15 wherein said first plurality of user interface objects includes a first window object and a first menu object, said first plurality of abstract representations including an abstract representation of said first window object and an abstract representation of said first menu object.

17. The system of claim 16 wherein said second plurality of user interface objects includes a second window object and a second menu object, said second plurality of abstract representations including an abstract representation of said second window object and an abstract representation of said second menu object.

* * * * *

UNITED STATES PATENT AND TRADEMARK OFFICE
CERTIFICATE OF CORRECTION

PATENT NO. : 5,640,537
DATED : June 17, 1997
INVENTOR(S) : Jessen et al.

It is certified that error appears in the above-identified patent and that said Letters Patent is hereby corrected as shown below:

In column 5 at line 9 delete "programing" and insert --programming--

In column 11 at line 57 delete "rifle" and insert --title--

In column 12 at line 3 delete "rifle" and insert --title--

In column 12 at line 7 delete "tide" and insert --title--

In column 14 at line 54 delete "fight" and insert --right--

In column 17 at line 49 delete "comer" and insert --corner--

In column 21 at line 8 delete "waits" and insert --traits--

UNITED STATES PATENT AND TRADEMARK OFFICE

CERTIFICATE OF CORRECTION

PATENT NO. : 5,640,537

DATED : June 17, 1997

INVENTOR(S) : Jessen et al.

It is certified that error appears in the above-identified patent and that said Letters Patent is hereby corrected as shown below:

In column 31 at line 39 delete "cede" and insert --code--

In column 31 at line 54 delete "cede" and insert --code--

In column 34 at line 10 delete "marcher" and insert --matcher--

Signed and Sealed this

Thirtieth Day of December, 1997

*Attest:*

Bruce Lehman

BRUCE LEHMAN

*Attesting Officer*

*Commissioner of Patents and Trademarks*